(12) United States Patent
Maruyama

(10) Patent No.: US 11,301,227 B2
(45) Date of Patent: Apr. 12, 2022

(54) SERVER APPARATUS, INFORMATION PROCESSING APPARATUS, AND CONTROL METHOD FOR INSTALLING APPLICATION

(71) Applicant: CANON KABUSHIKI KAISHA, Tokyo (JP)

(72) Inventor: Naoki Maruyama, Toride (JP)

(73) Assignee: CANON KABUSHIKI KAISHA, Tokyo (JP)

( * ) Notice: Subject to any disclaimer, the term of this patent is extended or adjusted under 35 U.S.C. 154(b) by 0 days.

(21) Appl. No.: 16/015,060

(22) Filed: Jun. 21, 2018

(65) Prior Publication Data

US 2019/0004782 A1 Jan. 3, 2019

(30) Foreign Application Priority Data

Jun. 29, 2017 (JP) .............................. JP2017-128044

(51) Int. Cl.
*G06F 8/61* (2018.01)
*G06F 21/57* (2013.01)
(Continued)

(52) U.S. Cl.
CPC .............. *G06F 8/61* (2013.01); *G06F 16/955* (2019.01); *G06F 21/57* (2013.01); *H04L 67/02* (2013.01); *H04L 67/34* (2013.01)

(58) Field of Classification Search
CPC ...... G06F 8/61; G06F 17/30876; G06F 21/57; G06F 16/955; H04L 67/34; H04L 67/02
(Continued)

(56) References Cited

U.S. PATENT DOCUMENTS

2007/0234354 A1\* 10/2007 Hattori .................... H04L 67/34
717/177
2008/0091800 A1\* 4/2008 Sorrentino et al. ..... H04L 67/02
709/219
(Continued)

FOREIGN PATENT DOCUMENTS

CN 102164163 A 8/2011
CN 102624701 A 8/2012
(Continued)

*Primary Examiner* — Wei Y Zhen
*Assistant Examiner* — Mohammed N Huda
(74) *Attorney, Agent, or Firm* — Canon U.S.A., Inc. IP Division

(57) ABSTRACT

An information processing apparatus in which a web browser configured to communicate with a server apparatus and a peripheral device is provided includes an execution unit, an identification information reception unit, an application information reception unit, and a transmission unit. The execution unit is configured to execute a script received via the web browser. The identification information reception unit is configured to, based on the execution unit having executed the script, receive device identification information about the peripheral device from the peripheral device. The application information reception unit is configured to transmit the device identification information received by the identification information reception unit to the server apparatus and receive application information from the server apparatus. The transmission unit is configured to transmit the application information received by the application information reception unit to the peripheral device so that the peripheral device installs an application.

14 Claims, 25 Drawing Sheets

(51) Int. Cl.
  *G06F 16/955*    (2019.01)
  *H04L 67/02*    (2022.01)
  *H04L 67/00*    (2022.01)

(58) Field of Classification Search
  USPC .......................................................... 717/178
  See application file for complete search history.

(56) References Cited

U.S. PATENT DOCUMENTS

2011/0258301 A1* 10/2011 McCormick et al. .. H04L 67/34
  709/222
2013/0247117 A1* 9/2013 Yamada et al. ......... H04L 67/34
  725/93
2016/0065714 A1* 3/2016 Marcos et al. ............ G06F 8/61
  455/556.1

FOREIGN PATENT DOCUMENTS

| CN | 102707912 A | 10/2012 |
| CN | 103051603 A | 4/2013 |
| CN | 103702157 A | 4/2014 |
| CN | 103902339 A | 7/2014 |
| CN | 105744314 A | 7/2016 |
| JP | 2002-287990 A | 10/2002 |

* cited by examiner

CONFIGURATION DIAGRAM OF
MULTIFUNCTION PERIPHERAL (100)

CONFIGURATION DIAGRAM OF ROM (202)

CONFIGURATION DIAGRAM OF
APP PROVISION WEB PAGE (102)

CONFIGURATION DIAGRAM
OF APP SERVER (103)

CONFIGURATION DIAGRAM OF APP PACKAGE (501)

EXAMPLE OF DEVICE TYPE/APP PACKAGE CORRESPONDENCE LIST (502)

| DEVICE TYPE NAME | APP PACKAGE |
|---|---|
| STERA_X1 | Application1, Application3, Application5 |
| STERA_X2 | Application1, Application5, Application9 |
| STERA_X3 | Application1, Application2 |

FIG.7

EXAMPLE OF APP SETTING FILE

*604*

| SETTING VALUE NAME | SETTING VALUE |
|---|---|
| uninstallableFlag | FALSE |
| runawayDecisionSec | 3500 |
| defaultEnableFlag | FALSE |
| ... | ... |

701 — uninstallableFlag
702 — runawayDecisionSec
703 — defaultEnableFlag

FIG.8

EXAMPLE OF DEVICE TYPE INFORMATION
ABOUT MULTIFUNCTION PERIPHERAL (100)

*800*

| DEVICE TYPE INFORMATION NAME | DEVICE TYPE INFORMATION VALUE |
|---|---|
| DEVICE TYPE NAME | STERA_XN |
| MODEL INFORMATION | MODEL_X |
| ... | ... |

801 — DEVICE TYPE NAME
802 — MODEL INFORMATION

FIG.9

AT-TIME-OF-INSTALLATION AUTOMATIC START CONDITIONS

*900*

| defaultEnableFlag | NEW INSTALLATION | APPLICATION STATE | AUTOMATIC START |
|---|---|---|---|
| FALSE | NO | Disable | NO |
| FALSE | NO | Enable | NO |
| FALSE | YES | ANY | NO |
| TRUE | NO | Disable | NO |
| TRUE | NO | Enable | YES |
| TRUE | YES | ANY | YES |

703

SERVER APPARATUS, INFORMATION PROCESSING APPARATUS, AND CONTROL METHOD FOR INSTALLING APPLICATION

BACKGROUND OF THE INVENTION

Field of the Invention

One disclosed aspect of the embodiments relates to an information processing apparatus for communicating with a peripheral device in which an application program can be provided, and to a server apparatus.

Description of the Related Art

There is an information processing apparatus capable of installing a separate loadable program (app) separately from an embedded program operating on the information processing apparatus, and of causing various services to operate. As a technique for installing an app, such an information processing apparatus acquires an app from outside the information processing apparatus and installs the app (Japanese Patent Application Laid-Open No. 2002-287990).

Japanese Patent Application Laid-Open No. 2002-287990 discusses a technique for installing an app on an information processing apparatus and enabling the app, using a web browser.

The conventional technique requires a user to perform many operations and is complicated, taking up the user's time to install an app. For example, the user needs to download the app in advance and write the name of the app and the file path of an app package held in a personal computer (PC). Furthermore, the installation and the enabling of the app are not a single set of processes, thus taking up the user's time more to enable the app. Thus, the conventional technique takes up the user's time to install and enable an app. This can be an obstacle for a user to install the app.

SUMMARY OF THE INVENTION

According to an aspect of the embodiments, an information processing apparatus in which a web browser configured to communicate with a server apparatus and a peripheral device is provided includes an execution unit, an identification information reception unit, an application information reception unit, and a transmission unit. The execution unit is configured to execute a script received via the web browser. The identification information reception unit is configured to, based on the execution unit having executed the script, receive device identification information about the peripheral device from the peripheral device. The application information reception unit is configured to transmit the device identification information received by the identification information reception unit to the server apparatus and receive application information from the server apparatus. The transmission unit is configured to transmit the application information received by the application information reception unit to the peripheral device so that the peripheral device installs an application.

Further features of the disclosure will become apparent from the following description of exemplary embodiments with reference to the attached drawings.

BRIEF DESCRIPTION OF THE DRAWINGS

FIG. 7 is a diagram illustrating an example of an app setting file according to an exemplary embodiment.

FIG. 8 is a diagram illustrating an example of device type information according to an exemplary embodiment.

FIG. 9 is a diagram illustrating conditions for automatically starting an app when the app is installed according to an exemplary embodiment.

DESCRIPTION OF THE EMBODIMENTS

With reference to the drawings, examples of exemplary embodiments for carrying out the disclosure will be described below.

Figure 1:
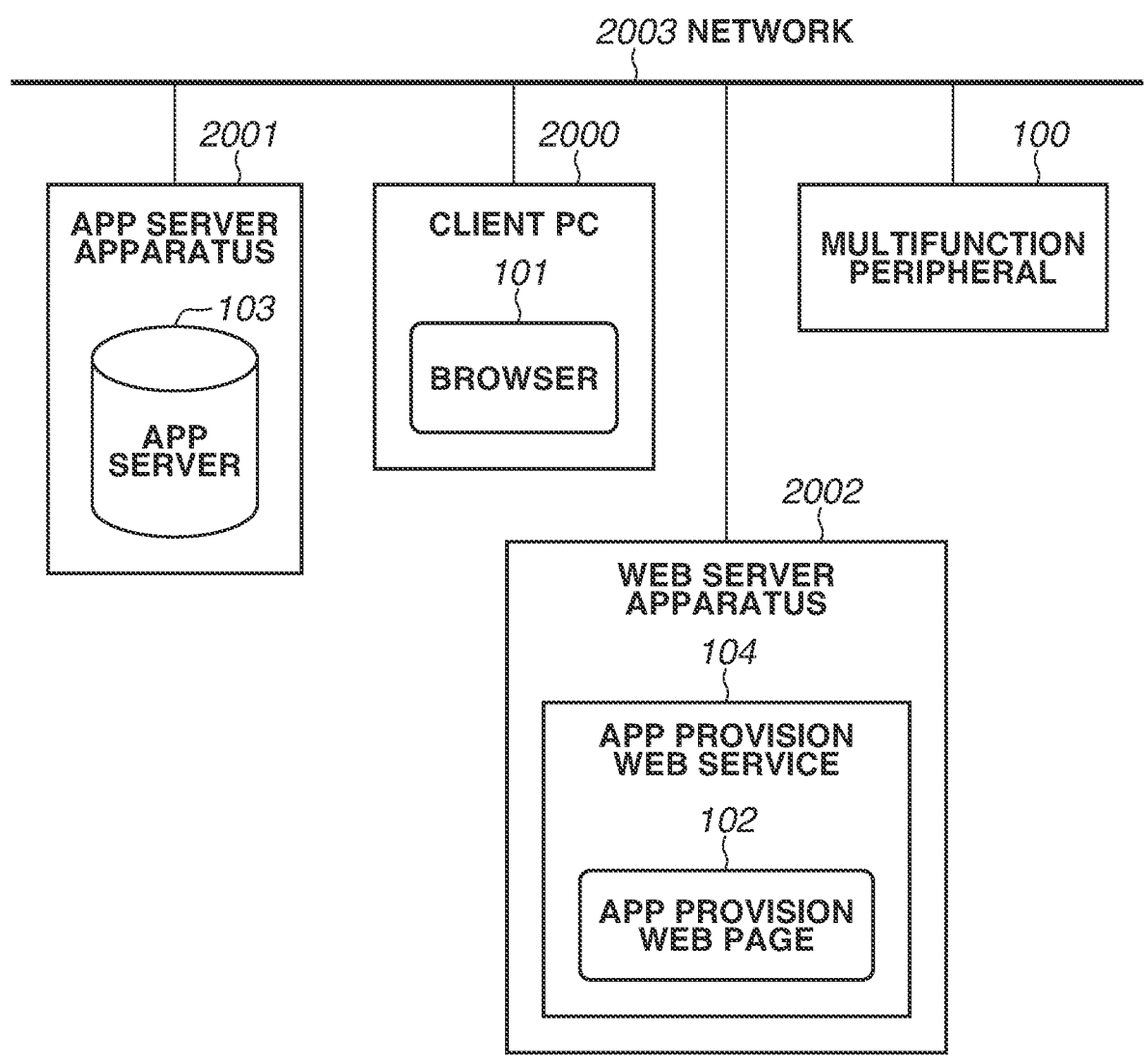
FIG. 1 is a diagram illustrating a configuration of a system according to an exemplary embodiment.

An example is taken where a peripheral device is a multifunction peripheral. An image forming apparatus is an example of the peripheral device. Examples of the peripheral device include a smartphone and an embedded device having an audio response function or an artificial intelligence (AI) function. The image forming apparatus can be an electrophotographic multifunction peripheral, a single-function printer, or an inkjet printer. FIG. 1 is a diagram illustrating a configuration of a system according to the present exemplary embodiment. A multifunction peripheral (100) and a browser (101) can communicate with each other via a network 2003. The browser (101) and an application (app) provision web page (102) can communicate with each other via the network 2003. The browser (101) and an app server (103) can communicate with each other via the network 2003. The app server (103) is included in an app server apparatus 2001. The browser (101) is included in a client personal computer (PC) 2000. The app provision web page 102 is included in a web server apparatus 2002. Services in the respective apparatuses communicate via the network 2003 as illustrated in FIG. 1. At this time, the app server (103) and the app provision web page (102) can communicate with the multifunction peripheral (100) via the browser (101). Specifically, the browser (101) acquires the app provision web page (102) and executes a program held in the app provision web page 102 or a program at a link destination using a central processing unit (CPU). In such a manner, the app server (103) and the multifunction peripheral (100) can perform two-way communication with each other via the browser 101. Alternatively, the app server apparatus 2001 may be integrated with the web server apparatus 2002. In this case, it is understood that a plurality of programs in the apparatus internally acquire, transmit, and receive various pieces of information.

Figure 2:
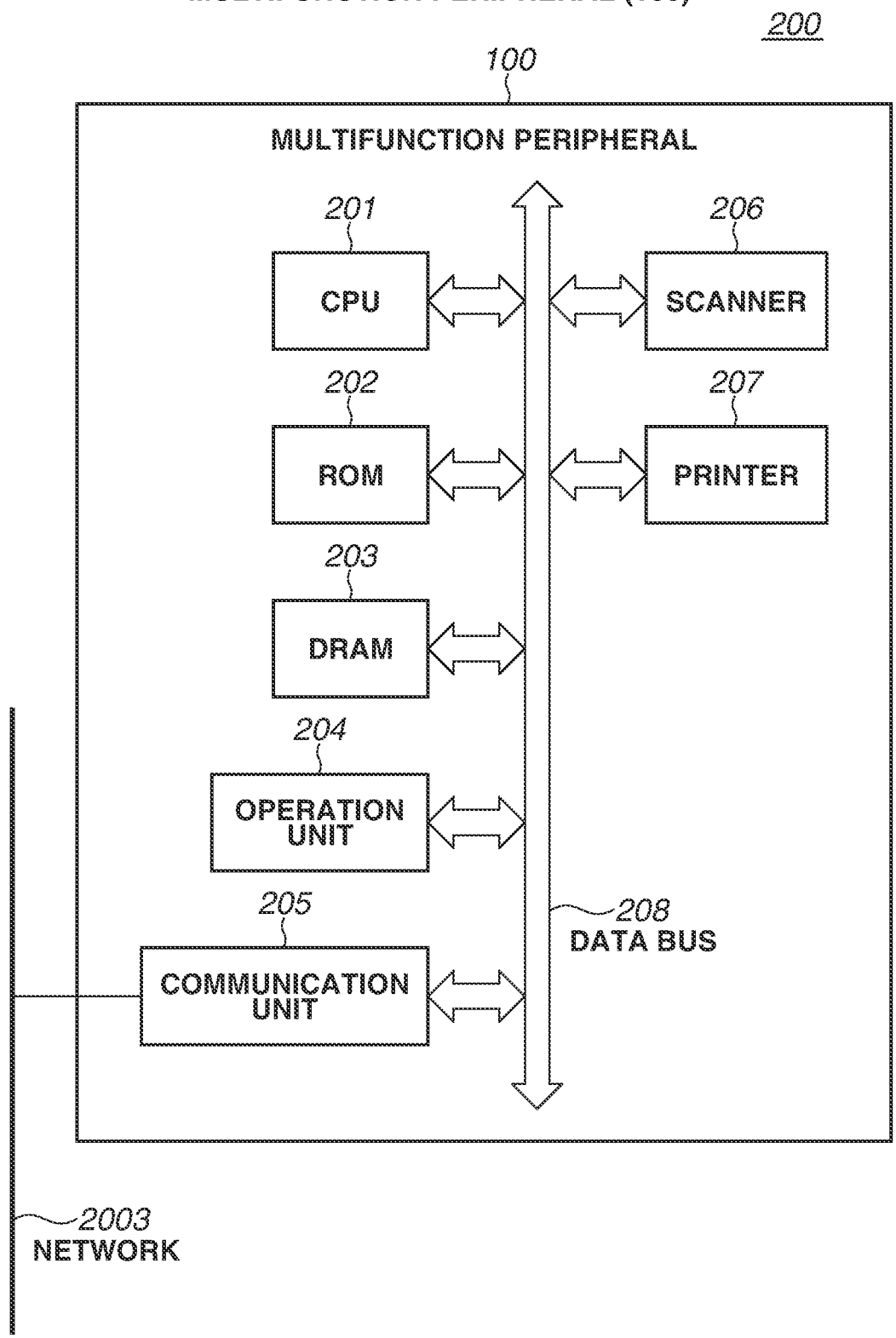
FIG. 2 is a diagram illustrating a configuration of hardware of a multifunction peripheral according to an exemplary embodiment.

FIG. 2 is a diagram illustrating an exemplary configuration of the multifunction peripheral (100). In the multifunction peripheral (100), a CPU (201) is a control unit for controlling a system and controls the entirety of the multifunction peripheral (100). A read-only memory (ROM) (202) includes a flash memory to allow read and write operations, such as an embedded MultiMediaCard (EMMC), and stores a control program for the CPU (201). The ROM (202) also stores a setting value and image data so that the setting value and the image data are not erased when the multifunction peripheral (100) is turned off. The ROM (202) also stores app package data. A dynamic random-access memory (DRAM) (203) stores a program control variable and may store instructions or program to be executed by the CPU (201). The DRAM (203) is a volatile memory capable of temporarily saving image data to be processed. An operation unit (204) is an interface unit with a user for displaying information in the device. A communication unit (205) is an interface unit between the device and an external communication network. The communication unit (205) includes a network communication unit, which is an interface with the network 2003. A scanner (206) is a device for reading image data and converting the image data into binary data. Using the scanner (206), an image transmission function reads a document. A printer (207) is a device for outputting image data to a recording sheet. These control units are connected together via a data bus (208).

A description is provided using an example where such a multifunction peripheral (100) acquires an app, which is a separate loadable program, separately from a main program operating on the main body of the multifunction peripheral (100) from outside the multifunction peripheral (100), installs the app on the multifunction peripheral (100) without user intervention, and changes the app to an enabled state, which is the state where the app can be executed.

Figure 25:
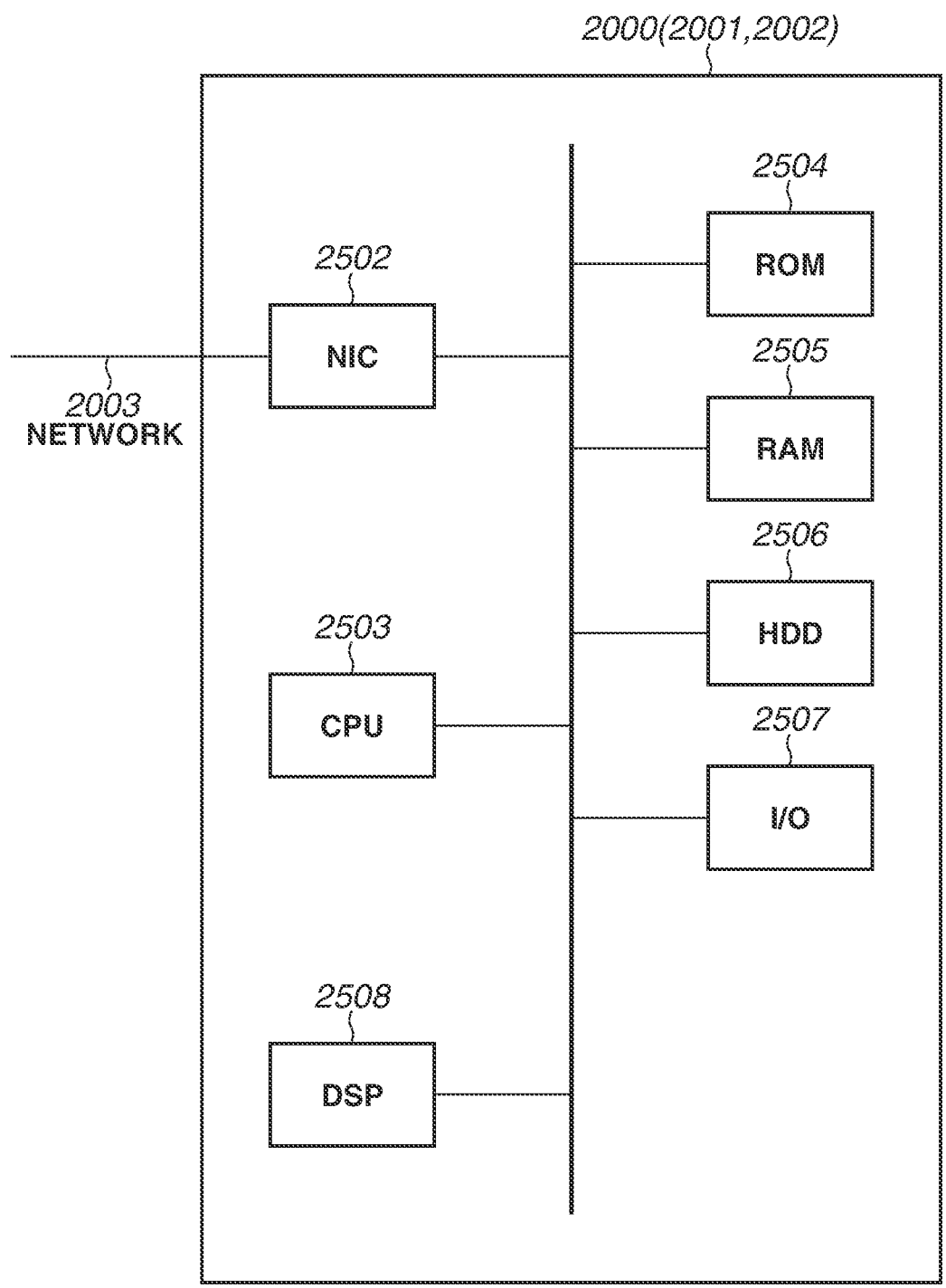
FIG. 25 is a diagram illustrating an example of a hardware configuration of each of a client personal computer (PC), an app server apparatus, and a web server apparatus according to an exemplary embodiment.

FIG. 25 is a diagram illustrating an example of the hardware configuration of each of the client PC 2000, the app server apparatus 2001, and the web server apparatus 2002. Each of these apparatuses includes a network interface card (NIC) 2502, a CPU 2503, and a ROM 2504. Further, each of these apparatuses includes a random-access memory (RAM) 2505, a hard disk drive (HDD) 2506, and input/output (I/O) 2507. The NIC 2502 is a device for communicating with the multifunction peripheral (100). The NIC 2502 is connected to the network 2003 in FIG. 1. The apparatus may be connected to a public line using a modem instead of the NIC 2502. The ROM 2504 stores a control program. The RAM 2505 is used as a work memory and may store instructions or the control program transferred from the ROM 2504. The HDD 2506 stores various data structures illustrated in the drawings of the present exemplary embodiment. The I/O 2507 transmits to and receives data from outside the apparatus. The CPU 2503 controls the NIC 2502, the ROM 2504, the RAM 2505, the HDD 2506, and the I/O 2507 by executing instructions stored in memory devices such as the ROM 2504 and the RAM 2505 to perform operations described in the following. A display (DSP) 2508 is a display device, such as a liquid crystal display or a cathode ray tube (CRT) display, and displays various processing results. The CPU 2503 controls process to be executed by the client PC 2000, the app server apparatus 2001, and the web server apparatus 2002 according to the present exemplary embodiment.

Figure 3:
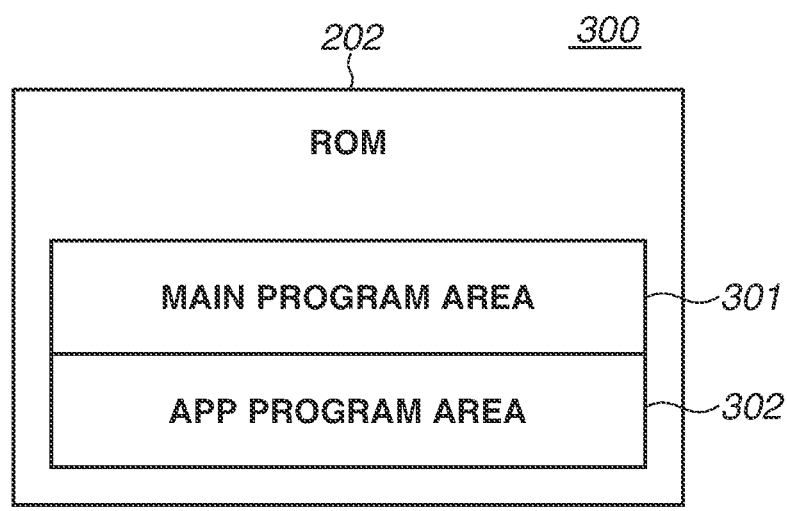
FIG. 3 is a configuration of a data area of a read-only memory (ROM) according to an exemplary embodiment.

FIG. 3 is a diagram illustrating an exemplary configuration of a data area of the ROM (202) in the multifunction peripheral (100). The ROM (202) is divided into a plurality of areas according to the uses. As the plurality of areas in the ROM(202), for example, a main program area (301) for causing the main body of the multifunction peripheral (100) to operate, and an app program area (302) for holding an app and causing the app to operate are defined.

Figure 4:
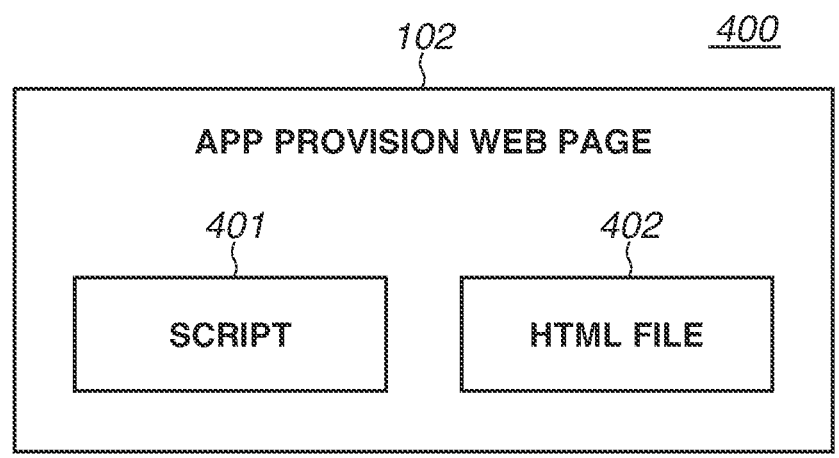
FIG. 4 is a diagram illustrating a configuration of an application (app) provision web page according to an exemplary embodiment.

FIG. 4 is a diagram illustrating an exemplary configuration of the app provision web page (102), which provides an app for the user. Information of the app provision web page (102) is stored in the HDD 2506 of the app server 2001. The app provision web page (102) includes an app installation script (401), which provides processes necessary for the installation of an app, such as the downloading and the transmission of the app, and a HyperText Markup Language (HTML) file (402), which is displayed on the page. If the browser (101) accesses the app provision web page (102), the app provision web page (102) provides the app installation script (401) for the browser (101) via the network 2003. The script (401) can be implemented by JavaScript (registered trademark). The script (401) in FIG. 4 is executed by the browser (101). Then, the script (401) can be configured to execute the processes of step S1404 and thereafter in FIG. 14 and the processes in FIGS. 15, 16, and 17. The script (401) may obtain its input parameters from the entry forms (to be described later in FIG. 10) and generates device type information and installed app package list.

Figure 5:
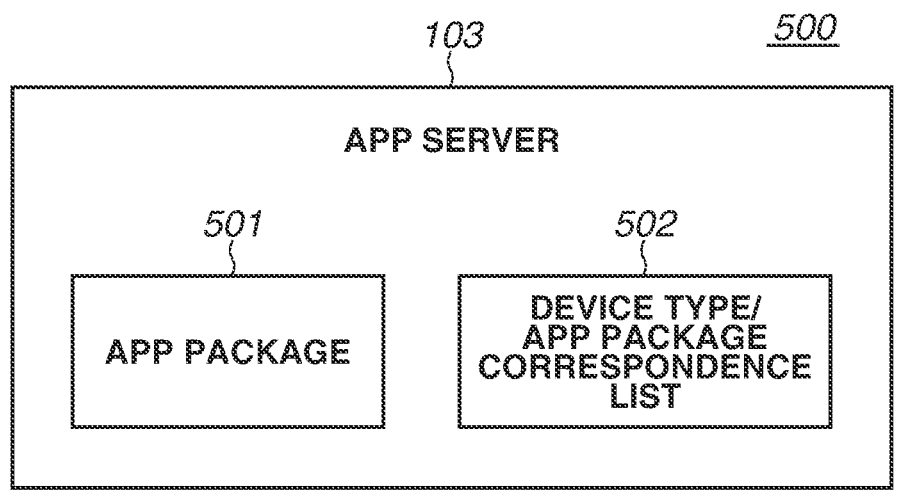
FIG. 5 is a diagram illustrating a configuration of an app server according to an exemplary embodiment.

FIG. 5 is a diagram illustrating an exemplary configuration of the app server (103). The app server (103) includes a plurality of app packages (501), which are provided for the multifunction peripheral (100), and a device type/app package correspondence list (502). As described above, the app server (103) is stored in the HDD 2506 of the app server apparatus 2001.

Figure 6:
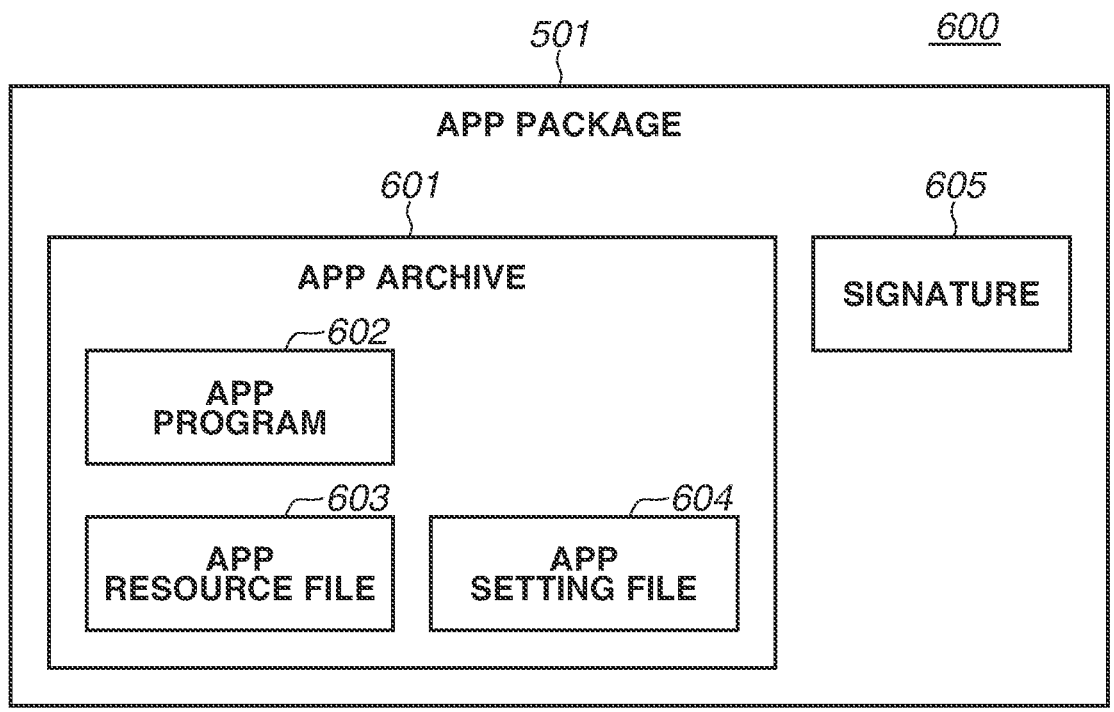
FIG. 6 is a diagram illustrating a configuration of an app package according to an exemplary embodiment.

FIG. 6 is a diagram illustrating exemplary configurations of each app package (501) and the device type/app package correspondence list (502) described with reference to FIG. 5. The app package (501) is stored in the HDD 2506 of the app server apparatus 2001. An exemplary configuration (600) of the app package (501) includes an app archive (601), which is obtained by compressing a group of app programs to be executed by the multifunction peripheral (100), and a signature (605), which verifies the validity of the app package (501). The app archive (601) includes an app program (602), which controls the operation of an app, an app resource file (603) of an image to be displayed in the app, and an app setting file (604), in which the operation settings of the app are written. An example (606) of the device type/app package correspondence list (502) has items including a device type name (801) and the name of an app package installable on a device type corresponding to the device type name (801).

FIG. 7 is a diagram illustrating an example of the content of the app setting file (604) described with reference to FIG. 6. In FIG. 7, three setting items are taken as examples. First, the first setting item is "uninstallableFlag" (701) for setting whether the app can be uninstalled. Next, the second setting item is "runawayDecisionSec" (702) for setting the freeze decision time of the app. Lastly, the third setting item is "defaultEnableFlag" (703) for setting whether the app is to be automatically enabled when the app is installed. When the "defaultEnableFlag" (703) is enabled, the app is automatically enabled in the multifunction peripheral (100) after the app is installed.

FIG. 8 is a diagram illustrating an example of device type information (800) of the multifunction peripheral (100). In this case, FIG. 8 illustrates as examples a device type name (801) of the multifunction peripheral (100) and model information (802), which indicates, for example, whether the multifunction peripheral (100) is a fee-charging device or whether the scanner (206) can be used. The device type information (800) in FIG. 8 is stored in the ROM 202 of the multifunction peripheral (100). The model information (802) includes information indicating whether the multifunction peripheral (100) is a model that should charge a fee for an application to be provided in the model. Although "STERA_XN" is written in the device type name (801), any identification information can be written. For example, in "N" of "STERA_XN", an integer equal to or greater than 1 can be stored, such as "STERA_X1" or "STERA_X2". Also in "X" of the model information (802), information identifying the model of any multifunction peripheral can be stored as in "MODEL_X" or "MODEL_Y". The model information (802) also includes information indicating whether the multifunction peripheral (100) is a fee-charging model that charges a fee for, for example, an application.

FIG. 9 is a diagram illustrating conditions (900) for automatically starting an app when the app is installed. If the automatic start is "YES" in these conditions, an app is automatically started or automatically enabled after being installed. For example, the "defaultEnableFlag" (703) is set to "FALSE" or "TRUE". In a case where the "defaultEnableFlag" (703) is "FALSE", the automatic start of the application after being newly updated is not set ("NO") regardless of whether the current installation is new or not. In a case where the "defaultEnableFlag" (703) is "TRUE", and if the current installation is not a new installation (an existing installed program that should be updated is present), and unless an application state is "DISABLE", the automatic start is set. A specific example of this process will be described in detail with reference to FIG. 24. Although defined as in FIG. 9, the conditions (900) may be defined differently. Then, an operation may be performed differently from FIG. 24. The automatic start is "YES" in two conditions: (1) the "defaultEnableFlag" (703) is set to "TRUE", the current installation is not a new installation, and the application state is "ENABLE"; and (2) the "defaultEnableFlag" (703) is set to "TRUE", the current installation is a new installation, and the application state is either "DISABLE" or "ENABLE."

Figure 10:
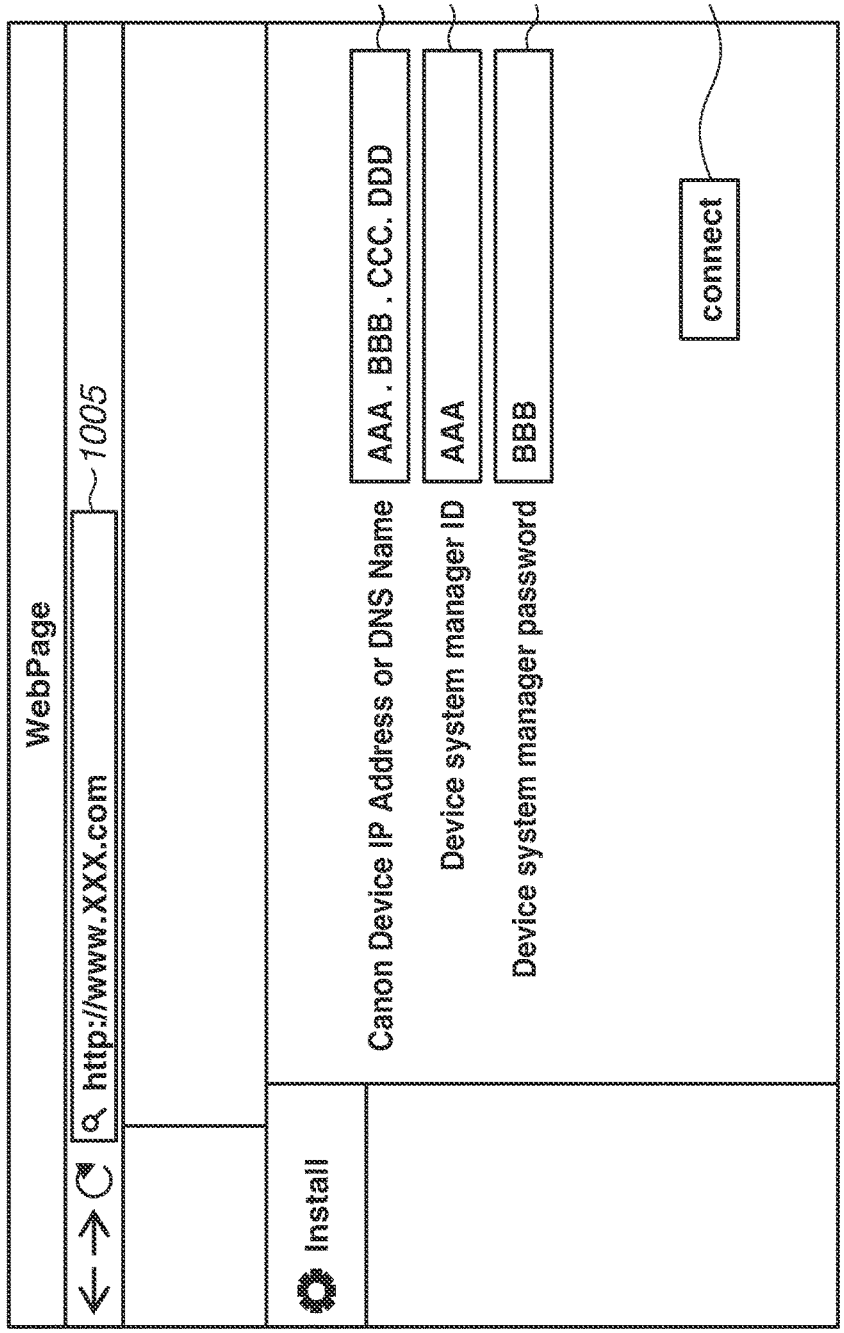
FIG. 10 is a diagram illustrating an example of an app provision page top screen according to an exemplary embodiment.
Figure 11:
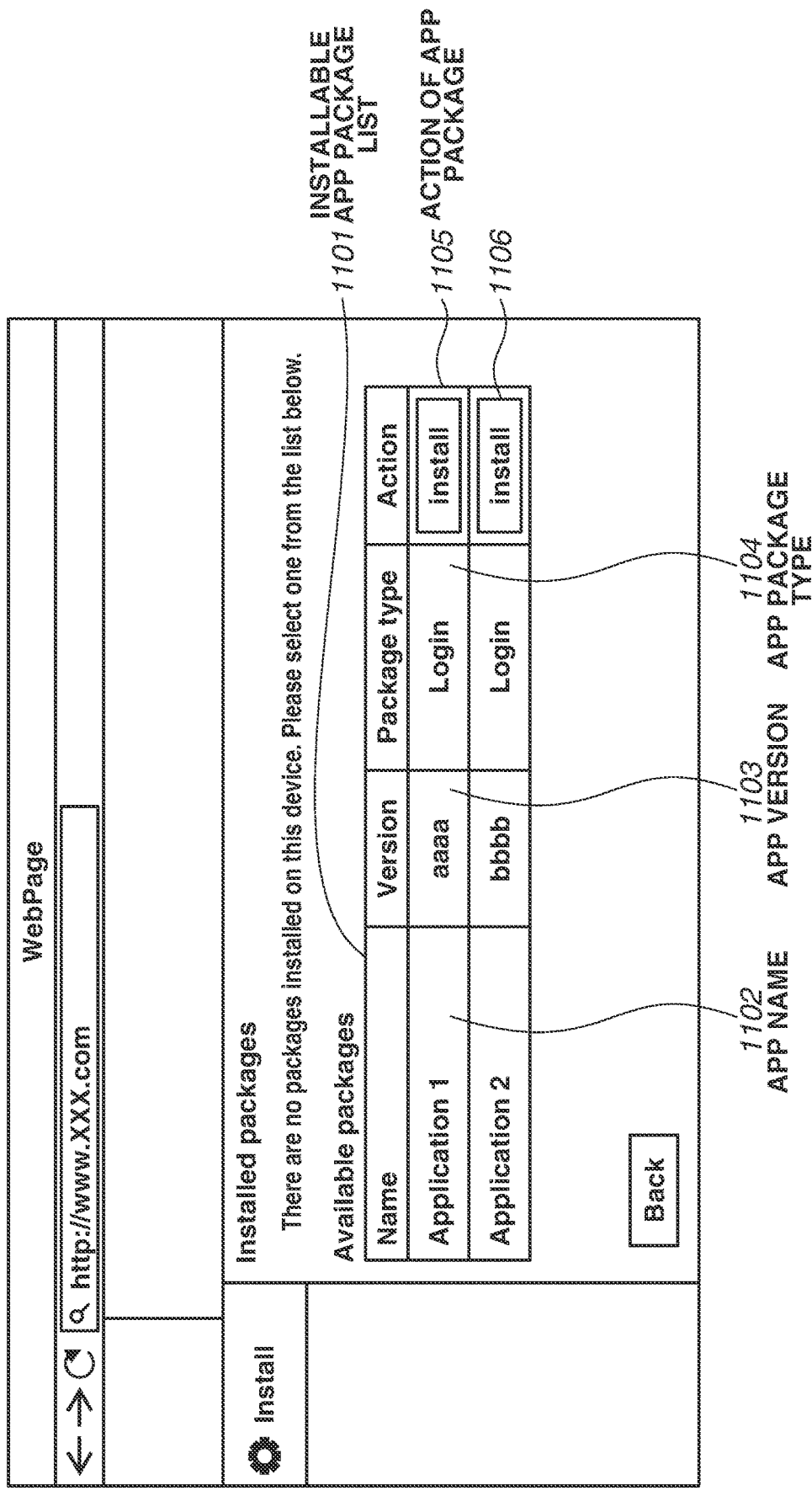
FIG. 11 is a diagram illustrating an example of an app installation management screen of an app provision page in a case where there is no installed app.
Figure 12:
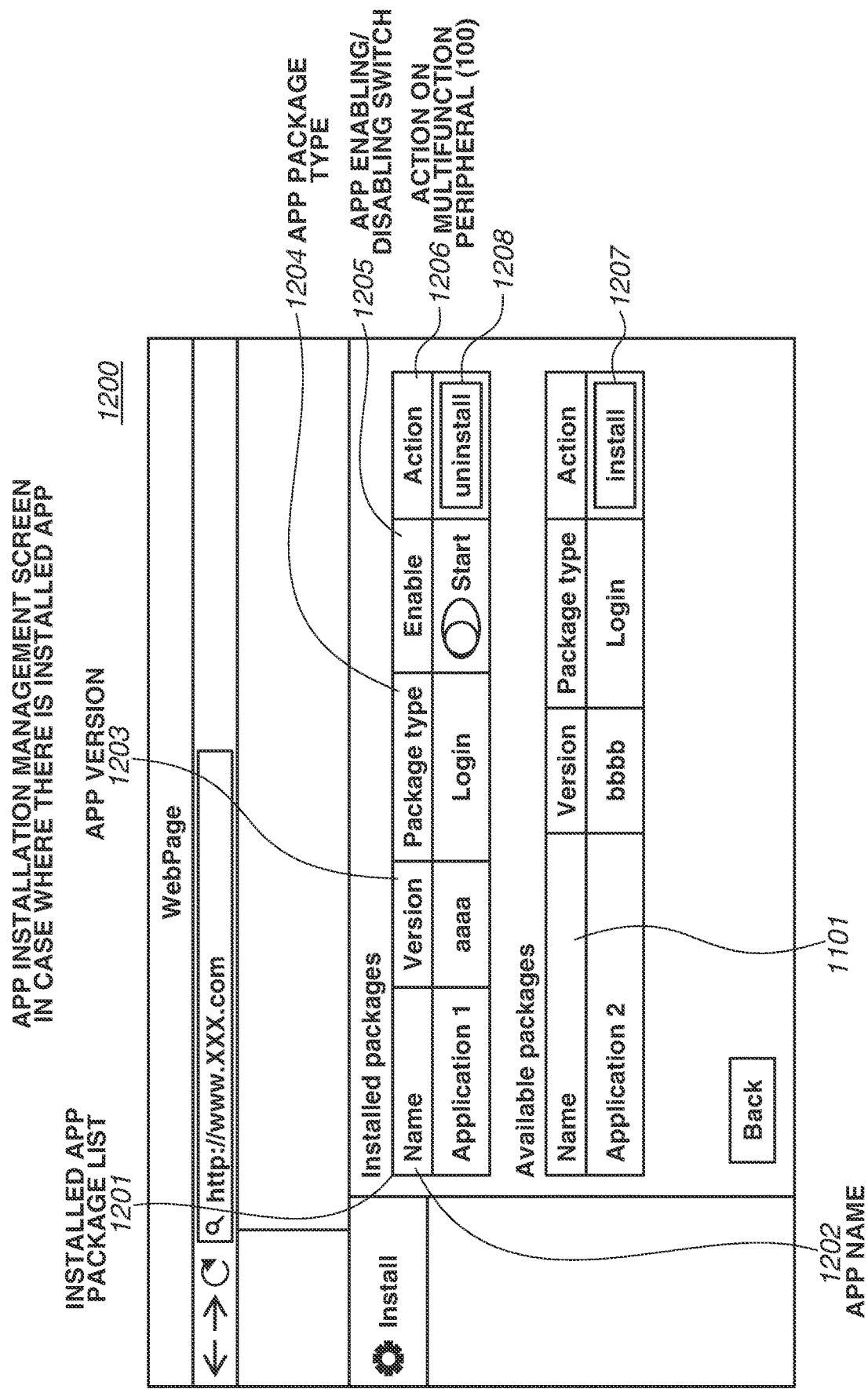
FIG. 12 is a diagram illustrating an example of an app installation management screen of the app provision page in a case where there is an installed app.

FIG. 10 is a diagram illustrating an app provision page top screen (1000). On this screen, forms to which three pieces of information are input regarding the multifunction peripheral (100) connected to the network 2003, and a single button are provided. First, the first form is a form (1001) to which the Internet Protocol (IP) address or the Domain Name System (DNS) name of the multifunction peripheral (100) is input. Next, the second form is a form (1002) to which the manager identification (ID) of the multifunction peripheral (100) is input. Lastly, the third form is a form (1003) to which the manager password of the multifunction peripheral (100) is input. Then, the app provision page top screen (1000) includes a device connection button (1004) for transmitting these pieces of information from the app provision web page (102) to the multifunction peripheral (100) through the browser (101). When the Uniform Resource Locator (URL) of the app provision web page (102) is input to a URL input portion of the browser (101) in the PC (2000), the app provision page top screen (1000) performs the following process. That is, the browser (101) accesses the app provision page (102) in the web server apparatus 2002 and acquires the data illustrated in FIG. 4. Then, the screen in FIG. 10 is displayed on the display device of the PC 2000. On the screen in FIG. 10, if inputs are provided to all the input portions 1001, 1002, and 1003, and the device connection button (1004) is pressed, the script (401) in FIG. 4 is executed. As a result, a screen in FIG. 11 or 12 is displayed. This process will be described in detail below.

Alternatively, the following process may be performed. First, the browser (101) of the client PC 2000 may access a web service embedded in the multifunction peripheral (100). While the browser (101) is accessing the web service, the browser (101) may display a management screen (not illustrated) for managing the multifunction peripheral (100). If a link is clicked on a predetermined screen of the management screen, the predetermined screen may jump to an app installation management screen 1100.

FIG. 11 is a diagram illustrating an app installation management screen (1100) displayed on the app provision web page (102) in a case where there is no installed app in the multifunction peripheral (100). This screen displays an installable app package list (1101) of app packages installable on the multifunction peripheral (100) among the app packages (501) owned by the app server (103). The app package list (1101) has items including an app name (1102), an app version (1103), an app package type (1104), and an action (1105) of an app package. The user presses a button for the action (1105) of an app package and thereby can install an app.

FIG. 12 is a diagram illustrating an app installation management screen (1200) displayed on the app provision web page (102) in a case where there is an installed app in the multifunction peripheral (100).

The button for the action (1105) of an app package in FIG. 11 is pressed, whereby a predetermined process is executed, and the screen in FIG. 11 transitions to the screen in FIG. 12. The predetermined process will be described in detail below. FIG. 12 illustrates the state where an application 1 can be uninstalled (1208), that is, the state where an application is installed on the multifunction peripheral (100). An application 2 is similar to that in FIG. 11.

That is, in an "Installed packages" portion, where no list is displayed in FIG. 11, an installed app package list (1201) of installed app packages owned by the multifunction peripheral (100) is currently displayed. The installed app package list (1201) has five items including an app name (1202), an app version (1203), an app package type (1204), an app enabling/disabling switch (1205), and an action (1206) on the multifunction peripheral (100). The user operates the app enabling/disabling switch (1205) and thereby can start or stop an app. Further, the action item 1206 has a default button according to whether the package is installed or available (but not yet installed). For an available package, the default button is "install." The user presses an "install" button (1106 in FIG. 11 or 1207 in FIG. 12) for an installation on the multifunction peripheral (100) and thereby can install an app on the multifunction peripheral (100). For an installed package, the default button is "uninstall." If the user presses an "uninstall" button 1208 in FIG. 12, an installed application is uninstalled from the multifunction peripheral (100). That is, the state in FIG. 12 returns to the state in FIG. 11.

Figure 13:
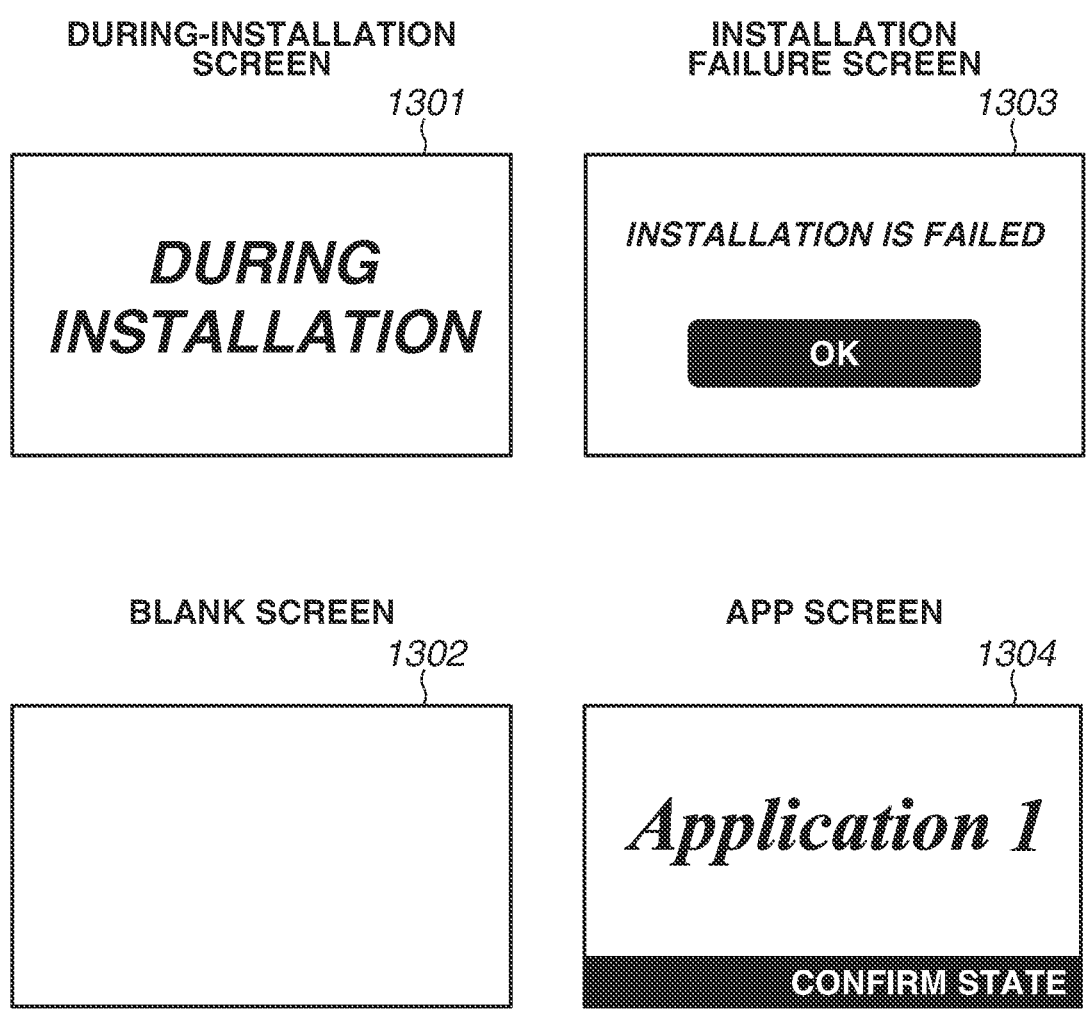
FIG. 13 is a diagram illustrating examples of screens to be displayed during an installation of an app.

FIG. 13 is a diagram illustrating examples of screens (1301 to 1304) to be displayed during the installation of an app. A during-installation screen (1301) is an example of a screen to be displayed so that the operation unit (204) is not operated while the app is being installed on the multifunction peripheral (100). A blank screen (1302) is an example of a screen to be displayed on the operation unit (204) when the installed app is automatically started and until the app is started. An installation failure screen (1303) is an example of a screen to be displayed on the operation unit (204) when a problem occurs during the installation of the app and the installation is failed. An app screen (1304) is an example of a screen to be displayed on the operation unit (204) when the installed app is started.

Next, with reference to flowcharts, a control method regarding the acquisition to the installation of an app is described. The operations illustrated in flowcharts in FIGS. 14 to 24 are realized by the following conditions being satisfied. The conditions are that the browser (101) loads the app installation script (401) provided by the app provision web page (102). Then, the browser (101) communicates with the multifunction peripheral (100) and the app server (103).

Alternatively, a plurality of browsers (101), a plurality of multifunction peripherals (100), and the app server (103) can also cooperate to execute the processes illustrated in the following flowcharts. Alternatively, some of the processes may be executed using a hardware circuit in addition to the CPU.

Figure 14:
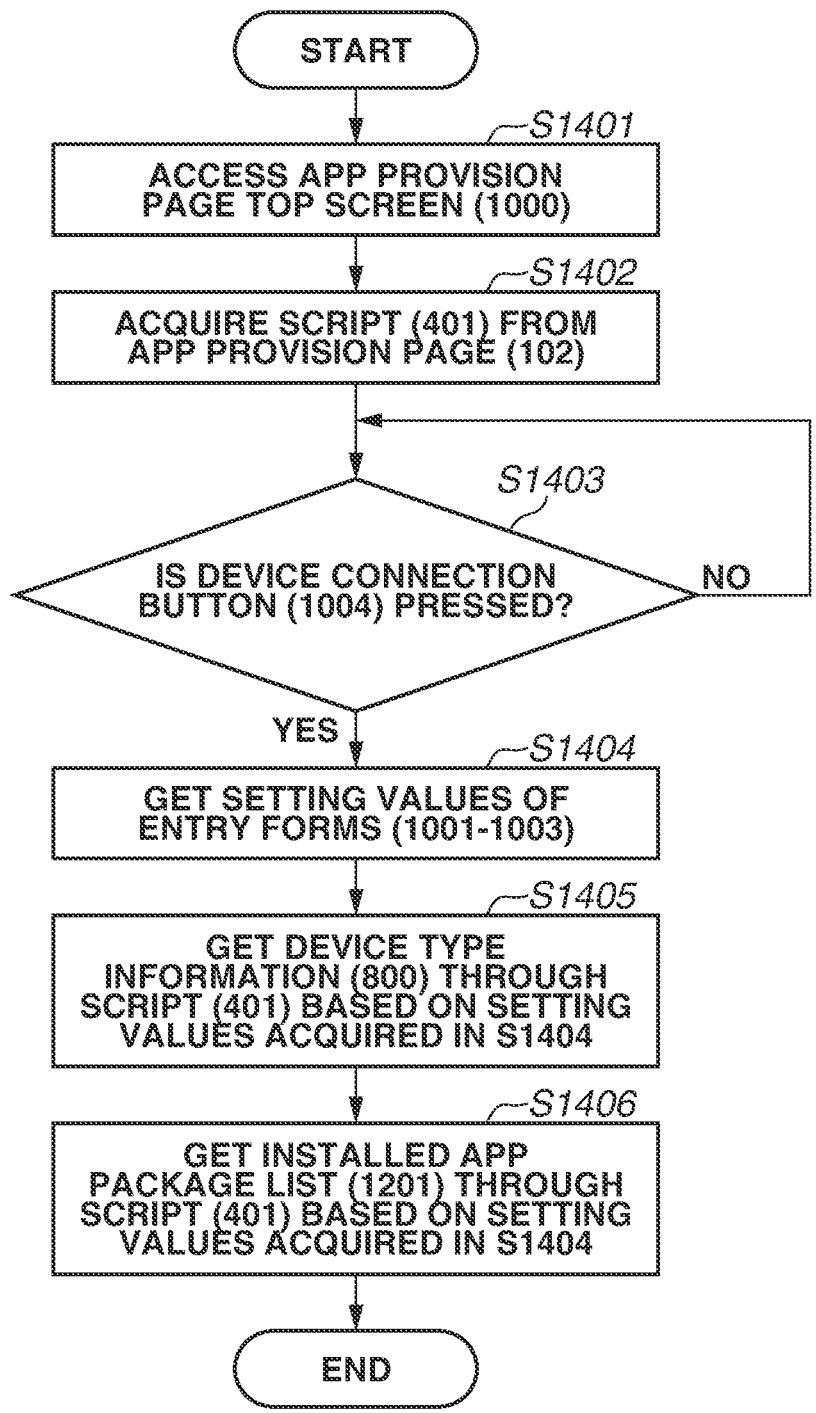
FIG. 14 is a diagram illustrating a flow where a browser acquires the device type information and an installed app package list.

First, the flowchart in FIG. 14 is described. FIG. 14 is a diagram illustrating control performed when the browser (101) acquires the device type information (800) and the installed app package list (1201) from the multifunction peripheral (100). First, the browser (101) is started in the client PC 2000. Then, the Uniform Resource Identifier (URI) of the web server apparatus 2002 is input to an address bar in FIG. 10 of the browser (101). According to the input, the execution of the processing in FIG. 14 is started under control of the CPU 2503 in the client PC 2000.

In step S1401, the browser (101) accesses the app provision page top screen (1000). Then, in step S1402, the browser (101) acquires the app provision page (102) from the app provision web service 104. The app provision page (102) includes the installation script (401) and the HTML file 402. The browser (101) analyzes the HTML file 402 and the script (401). Then, the browser (101) displays the app provision page top screen (1000) in FIG. 10 on the DSP 2508 of the client PC 2000.

Then, in step S1403, the browser (101) waits until the user presses the device connection button (1004) on the app provision page top screen (1000). If the user inputs information to the entry forms 1001 to 1003 and presses the device connection button (1004) (YES in step S1403), the processing proceeds to step S1404.

In step S1404, the browser 101 acquires the setting values of the entry forms (1001 to 1003), and the processing proceeds to step S1405.

In step S1405, based on the setting values acquired in step S1404, the CPU 2503 controlled by the browser 101 executes the installation script (401). According to the execution of the script 401, the browser (101) acquires the device type information (800) from the multifunction peripheral (100), and the processing proceeds to step S1406.

In step S1406, based on the setting values acquired in step S1404, the CPU 2503 executes the installation script (401). In this process, the browser (101) acquires the installed app package list (1201) from the multifunction peripheral (100).

Figure 15:
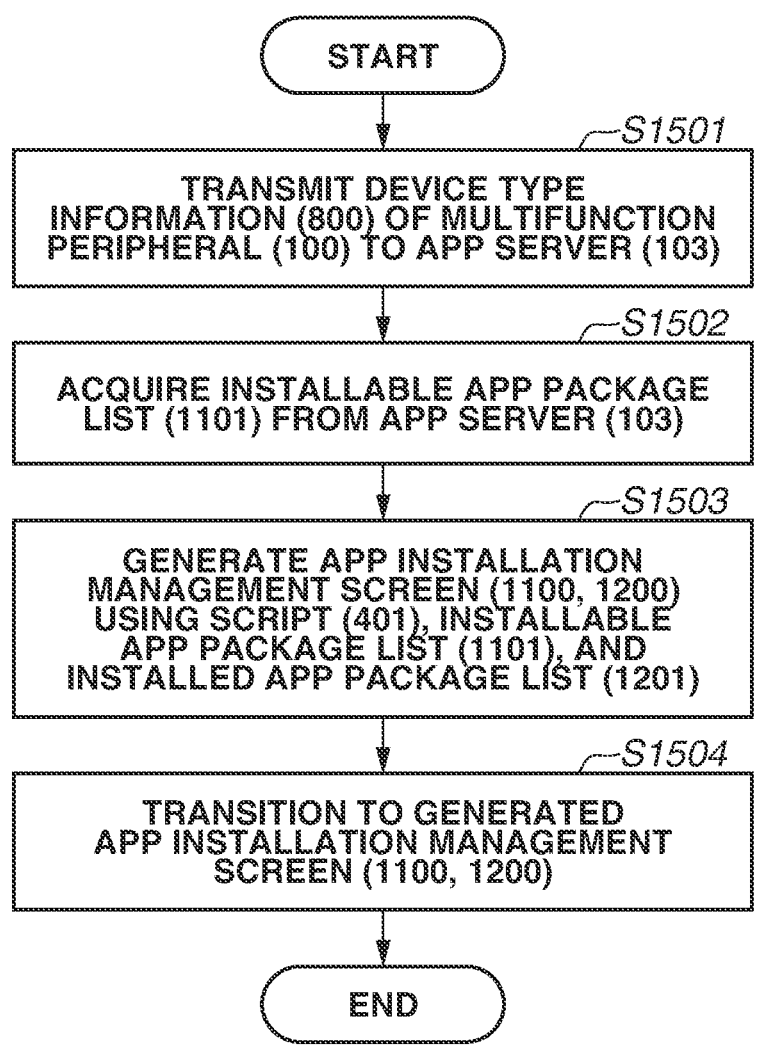
FIG. 15 is a diagram illustrating details about an app package list acquisition process.

Next, the flowchart in FIG. 15 is described. FIG. 15 is a diagram illustrating the details of the app package list acquisition process in FIG. 14 (step S1406), which is performed by the client PC 2000. The browser (101) acquires the installable app package list (1101) from the app server (103), and the current screen transitions to the app installation management screen (1100 or 1200).

In step S1501, the browser (101) transmits the device type information (800) acquired from the multifunction peripheral (100) to the app server (103), and the processing proceeds to step S1502. After this, the app server (103) performs the processing in FIG. 18 described below. Then, in step S1502, the browser (101) acquires from the app server (103) the installable app package list (1101) of app packages installable on the multifunction peripheral (100), and the processing proceeds to step S1503.

In step S1503, the browser (101) generates the app installation management screen (1100 or 1200) using the results of the installation script (401) and two app package lists, namely, the installable app package list (1101) of app packages installable on the multifunction peripheral (100) and the installed app package list (1201) of app packages installed on the multifunction peripheral (100). In this case, first, if an application is not installed on the multifunction peripheral (100) (e.g., when the multifunction peripheral (100) is installed), the screen in FIG. 11 is received from the app server apparatus 2001 and displayed. At this time, if there is no app package installed on the multifunction peripheral (100), the installed app package list (1201) is not displayed. At this time, the app installation management screen (1100) representing the wording "there is no installed app" may be displayed. If there is an app package installed on the multifunction peripheral (100), the app installation management screen (1200) representing the installed app package list (1201) is displayed.

In step S1504, the current screen transitions to the app installation management screen (1100 in FIG. 11 or 1200 in FIG. 12) generated by the browser (101) in step S1503. At this time, to describe the installation of an app, a case is assumed where no app is installed on the multifunction peripheral (100) immediately after the multifunction peripheral (100) is placed. Thus, the current screen transitions to the app installation management screen (1100).

Figure 16:
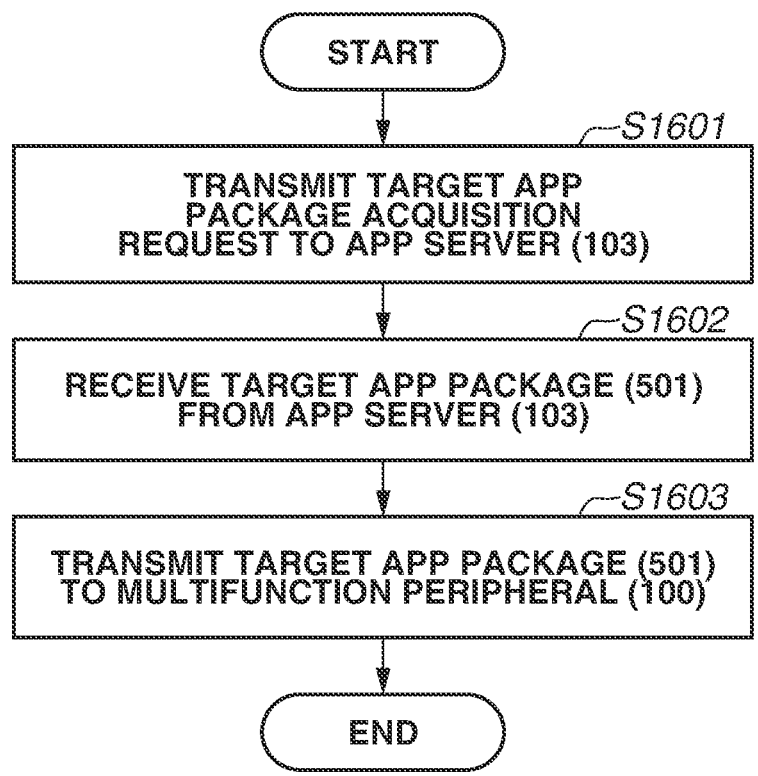
FIG. 16 is a diagram illustrating a flow where the browser downloads from the app server an app package selected by a user and transmits the app package to a peripheral device.

Next, the flowchart in FIG. 16 is described. FIG. 16 is a diagram illustrating the flow where the browser (101) downloads from the app server (103) an app package selected by the user and transmits the app package to the multifunction peripheral (100). That is, the processing in FIG. 16 is executed under control of the CPU 2503 in the client PC 2000. This flow is started by the user pressing the button for the action (1105 or 1207) of an app package in step S1504.

In step S1601, the browser (101) transmits to the app server (103) an app package acquisition request to acquire the app package as a downloading target selected by the user, and the processing proceeds to step S1602. Meanwhile, the app server (103) performs the processing in FIG. 19.

Then, in step S1602, the browser (101) receives the target app package (501) from the app server (103), and the processing proceeds to step S1603.

In step S1603, the browser (101) transmits the target app package (501) to the multifunction peripheral (100).

Figure 17:
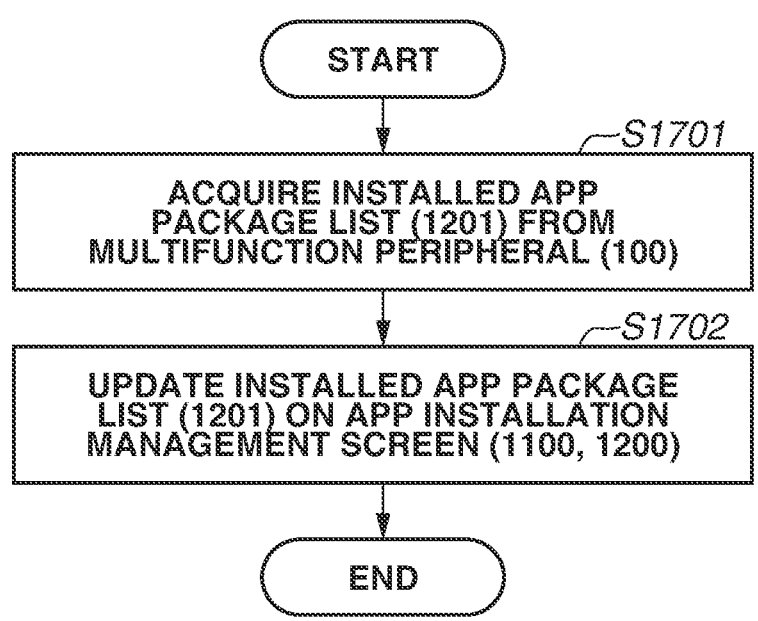
FIG. 17 is a diagram illustrating a flow to be performed by the browser after an installation of an app is completed.

Next, the flowchart in FIG. 17 will be described. FIG. 17 is a diagram illustrating the flow to be performed by the browser (101) after the installation of an app package (501) is completed. That is, the processing in FIG. 17 is executed under control of the CPU 2503 in the client PC 2000. This flow is started in a case where an installation result notification is received from the multifunction peripheral (100). In step S1701, the browser (101) acquires the installed app package list (1201) from the multifunction peripheral (100), and the processing proceeds to step S1702. In step S1702, the browser (101) updates the app installation management screen (1100 or 1200) using the installed app package list (1201) acquired in step S1701.

Figure 18:
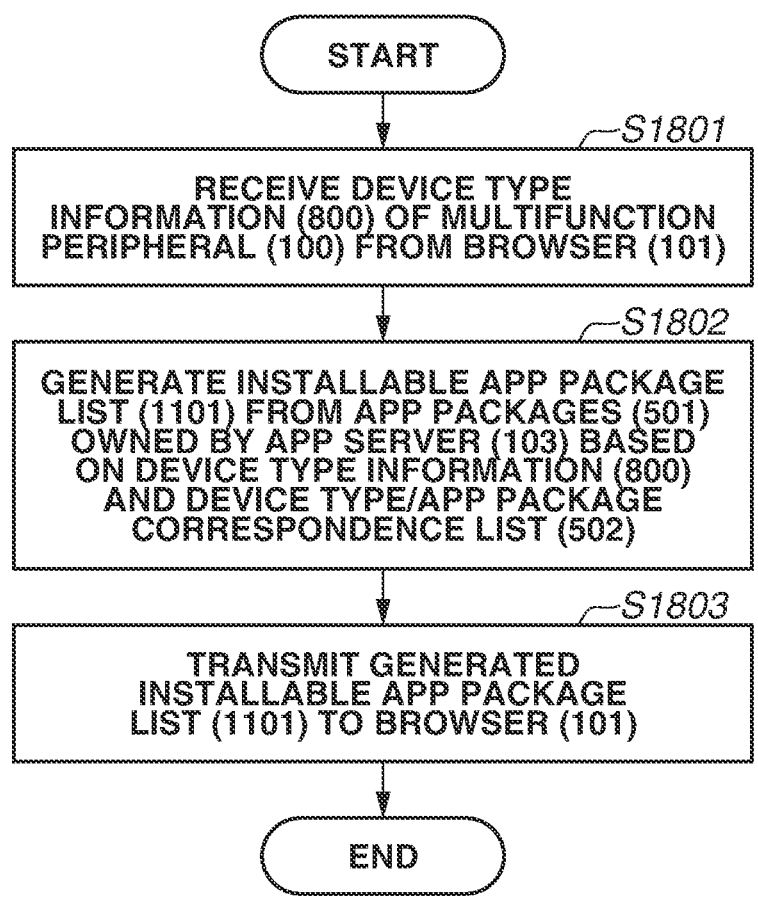
FIG. 18 is a diagram illustrating a flow where the app server generates an installable app package list of installable app packages.

Next, the flowchart in FIG. 18 will be described. FIG. 18 is a diagram illustrating the flow where the app server (103) generates the installable app package list (1101) of app packages installable on the multifunction peripheral (100). That is, the processing in FIG. 18 is realized by the CPU 2503 in the app server apparatus 2001 executing the app server (103).

In step S1801, the app server (103) receives the device type information (800) of the multifunction peripheral (100) from the browser (101), and the processing proceeds to step S1802. The device type information (800) to be received here is transmitted from the multifunction peripheral (100) in step S1501.

In step S1802, based on the device type information (800) and the device type/app package correspondence list (502), the app server (103) generates the installable app package list (1101) of app packages installable on the multifunction peripheral (100) from the app packages (501) owned by the app server (103). Specifically, a list of app packages corresponding to the device type name (801) indicated by the device type information (800) is selected and generated from the device type/app package correspondence list (502).

In step S1803, the app server (103) transmits the generated installable app package list (1101) to the browser (101). This information is received by the multifunction peripheral (100) in step S1502.

Figure 19:
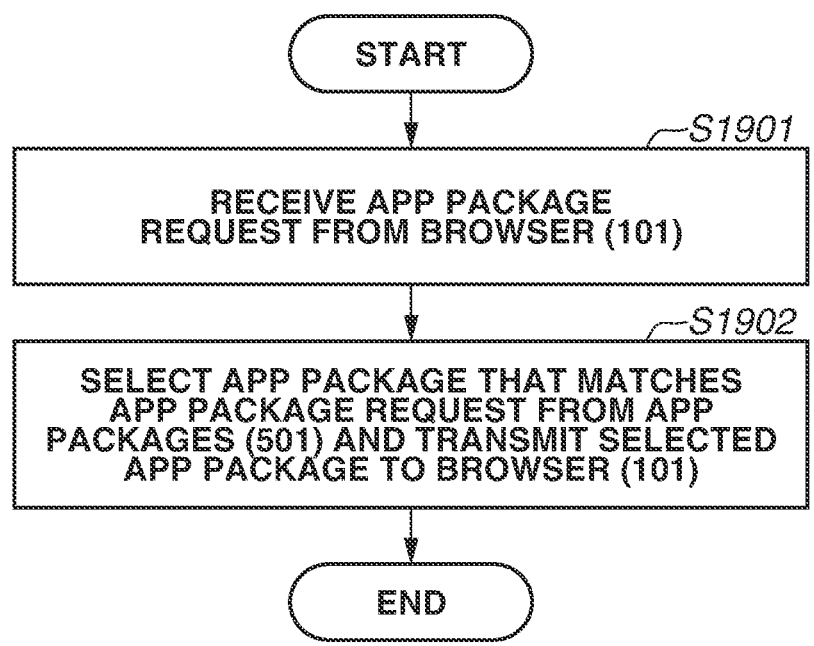
FIG. 19 is a diagram illustrating a flow where the app server transmits an app package to the browser.

Next, the flowchart in FIG. 19 is described. FIG. 19 is a diagram illustrating the flow where the app server (103) transmits an app package (501) to the browser (101). That is, the processing in FIG. 19 is realized by the CPU 2503 in the app server apparatus 2001 executing the app server (103).

In step S1901, the app server (103) receives an app package request from the browser (101), and the processing proceeds to step S1902. This app package request is transmitted from the browser (101) to the app server apparatus 2001 in step S1601 in FIG. 16.

In step S1902, the app server (103) selects an app package (501) that matches the app package request from the app packages (501) owned by the app server apparatus 2001. Then, the app server (103) transmits the selected app package (501) to the browser (101).

Figure 20:
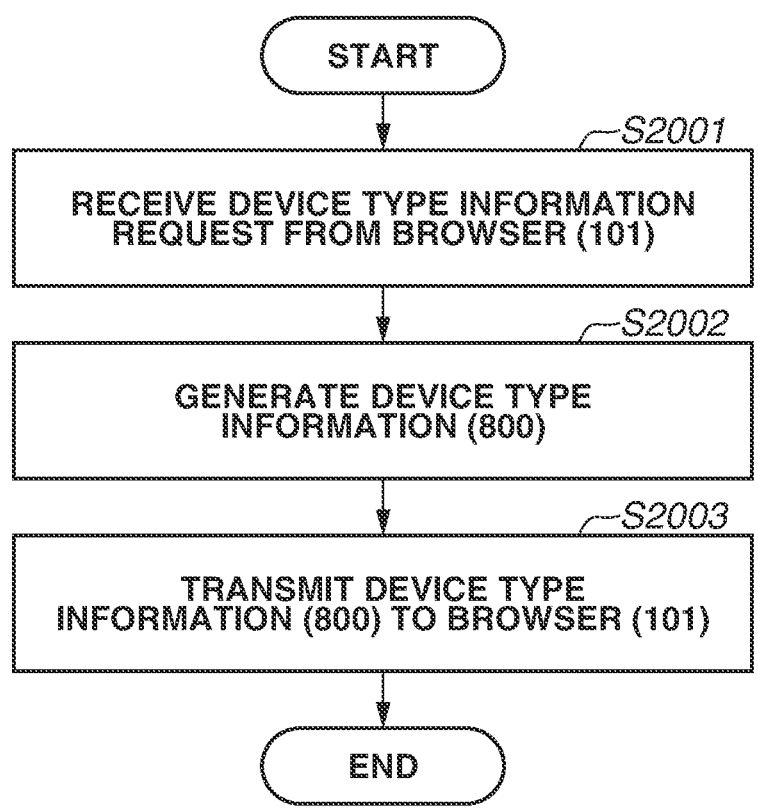
FIG. 20 is a diagram illustrating a flow where the device type information according to an exemplary embodiment is transmitted to the browser.

Next, the flowchart in FIG. 20 is described. FIG. 20 is a diagram illustrating the flow where the multifunction peripheral (100) transmits the device type information (800) to the browser (101). In step S1501 in FIG. 15, the browser (101) transmits a device type information request according to the execution of the script (401). Then, according to the fact that the multifunction peripheral (100) receives the device type information request, the processing in FIG. 20 is started. The processing in FIGS. 20 to 24 is executed under control of the CPU 201 of the multifunction peripheral (100).

In step S2001, the multifunction peripheral (100) receives the device type information request from the browser (101), and the processing proceeds to step S2002. In step S2002, the multifunction peripheral (100) generates the device type information (800), and the processing proceeds to step S2003.

In step S2003, the multifunction peripheral (100) transmits the device type information (800) generated in step S2002 to the browser (101).

Figure 21:
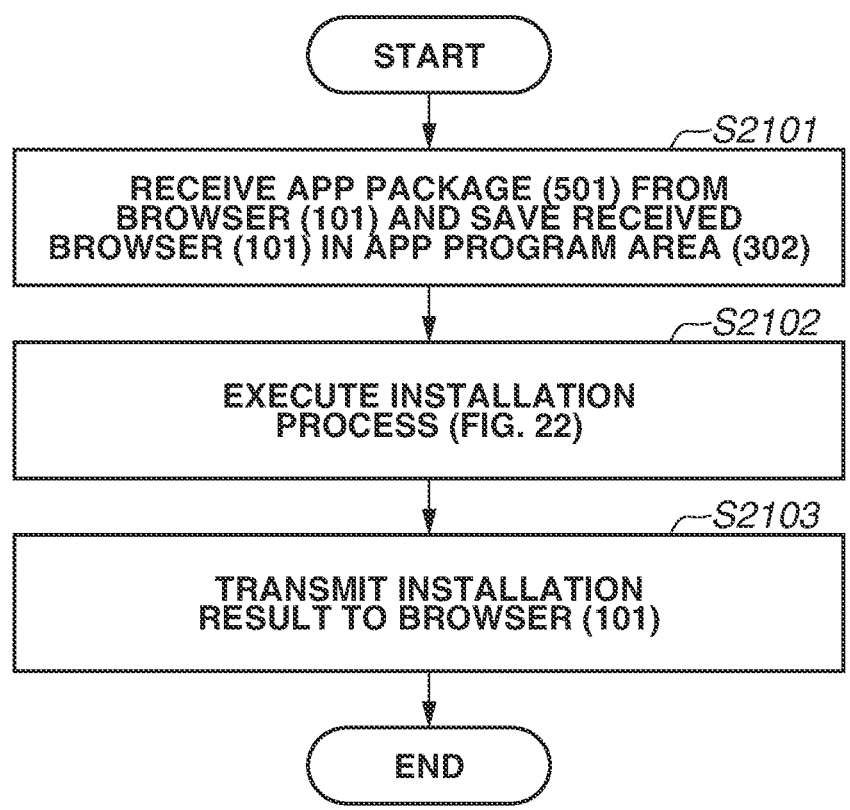
FIG. 21 is a diagram illustrating a flow where an app package according to an exemplary embodiment is received, and an installation of the app package is executed.

Next, the flowchart in FIG. 21 is described. FIG. 21 is a diagram illustrating the flow where the multifunction peripheral (100) receives an app package (501) and executes the installation of the app package (501) (step S2200).

An app package (501) is transmitted from the browser (101) to the multifunction peripheral (100) in step S1603 in FIG. 16. On the basis that the multifunction peripheral 100 receives this app package 501, the processing in FIG. 21 is started.

In step S2101, the multifunction peripheral (100) receives the app package (501) from the browser (101) and saves the received app package (501) in the app program area (302) of the ROM (202), and the processing proceeds to step S2102. In step S2102, the multifunction peripheral (100) executes an installation process (step S2200) for installing the app package (501), and the processing proceeds to step S2103. The installation process (step S2200) will be described below. In step S2103, the multifunction peripheral (100) transmits the installation result to the browser (101).

Figure 22:
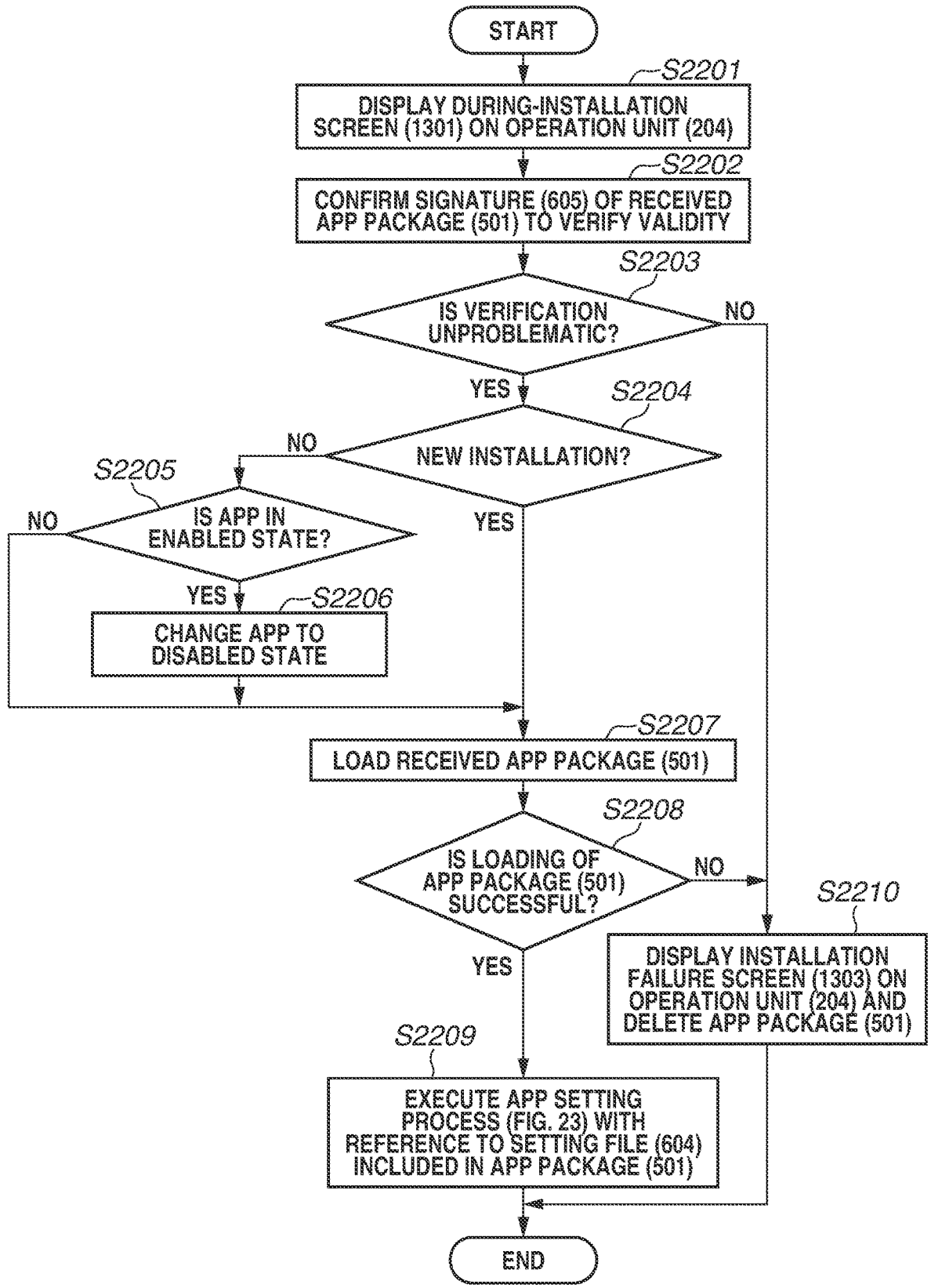
FIG. 22 is a diagram illustrating a flow of the installation of the app package according to an exemplary embodiment.

Next, the flowchart in FIG. 22 is described. FIG. 22 is a diagram illustrating the flow of the installation of the app package (501) executed by the multifunction peripheral (100). This processing corresponds to step S2102 in FIG. 21.

In step S2201, the multifunction peripheral (100) displays the during-installation screen (1301 in FIG. 13) on the operation unit (204), and the processing proceeds to step S2202.

In step S2202, the multifunction peripheral (100) checks the signature (605) of the app package (501) received by the multifunction peripheral (100) to verify the validity of the app package (501), and the processing proceeds to step S2203. Through this process, manipulation of the received app package (501) can be detected.

In step S2203, the multifunction peripheral (100) checks whether the result of the verification performed by the multifunction peripheral (100) in step S2202 is unproblematic. For example, if the verification in S2202 indicates that any verified programs in S2202 are collapsed or altered, it is indicated as problematic. If the verification result is unproblematic (YES in step S2203), the processing proceeds to step S2204. If the verification result is problematic (NO in step S2203), the processing proceeds to step S2210 to stop the installation.

In step S2204, the multifunction peripheral (100) checks whether the installation performed by this processing (step S2200) is a new installation. If the installation is not a new installation (NO in step S2204), the processing proceeds to step S2207. If the installation is a new installation (YES in step S2204), the processing proceeds to step S2205 to determine the enabled state of the app.

In step S2205, the multifunction peripheral (100) checks whether the installed existing target app is in the enabled state. If the target app is in the enabled state (YES in step S2205), it is necessary to change the app to a disabled state for the installation. Thus, the processing proceeds to step S2206. If the target app is in the disabled state (NO in step S2205), the processing proceeds to step S2207.

In step S2206, the multifunction peripheral (100) changes the target app in the enabled state to the disabled state, and the processing proceeds to step S2207.

In step S2207, the multifunction peripheral (100) loads the received app package (501) into the app program area (302), and the processing proceeds to step S2208.

In step S2208, the multifunction peripheral (100) checks whether the loading process performed in step S2207 is successful. For example, if the app program area (302) of the ROM (202) has insufficient free space, the loading is failed (NO in step S2208). Thus, the processing proceeds to step S2210 to stop the installation. If the loading is successful (YES in step S2208), the processing proceeds to step S2209.

In step S2209, with reference to the setting file (604) included in the loaded app package (501), the multifunction peripheral (100) executes an app setting process. This app setting process (the processing in FIG. 23) will be described below.

In step S2210, to notify the user that the installation of the app package (501) on the multifunction peripheral (100) is failed, the multifunction peripheral (100) displays the installation failure screen (1303) on the operation unit (204) and deletes the app package (501).

Figure 23:
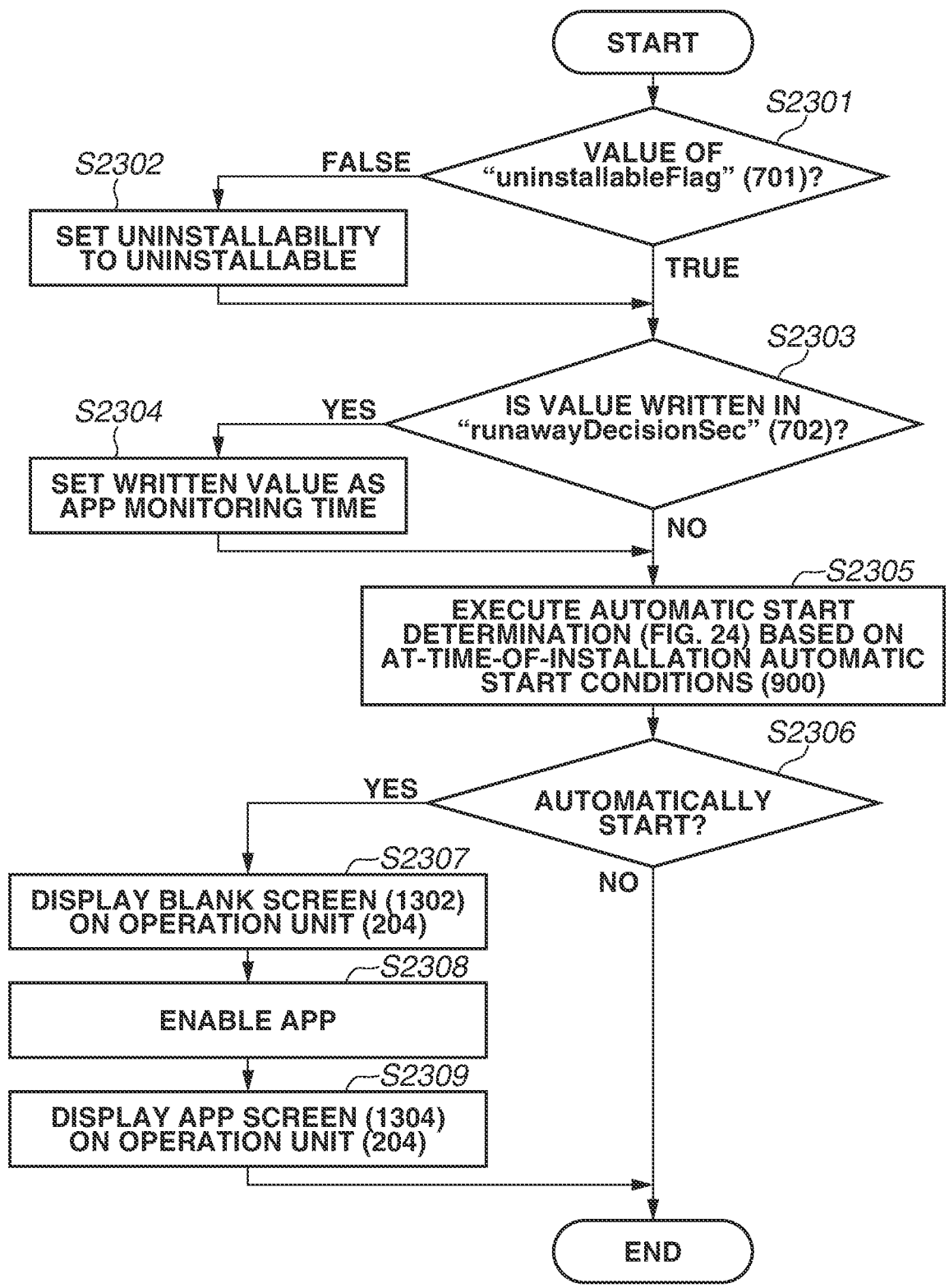
FIG. 23 is a diagram illustrating a flow of an app setting process according to an exemplary embodiment.

Next, the flowchart in FIG. 23 is described. FIG. 23 is a part of step S2209 in FIG. 22. FIG. 23 is a diagram illustrating the flow of the app setting process executed by the multifunction peripheral (100). At this time, the multifunction peripheral (100) performs this processing with reference to the app setting file (604). In the present exemplary embodiment, the description will be provided based on an example (700) of the app setting file (604).

In step S2301, the multifunction peripheral (100) references the setting value of the "uninstallableFlag" (701) described in the example (700) of the app setting file (604) in FIG. 7. At this time, if "FALSE" is set (FALSE in step S2301), the processing proceeds to step S2302. If "TRUE" is set (TRUE in step S2301), the processing proceeds to step S2303.

In step S2302, the multifunction peripheral (100) sets the uninstallability of the app to uninstallable, and the processing proceeds to step S2303.

In step S2303, the multifunction peripheral (100) references the setting value of the "runawayDecisionSec" (702) described in the example (700) of the app setting file (604). At this time, if any value is set (YES in step S2303), the processing proceeds to step S2304. If no value is set (NO in step S2303), the processing proceeds to step S2305.

In step S2304, the multifunction peripheral (100) sets the setting value of the "runawayDecisionSec" (702) as the app monitoring time, and the processing proceeds to step S2305.

In step S2305, based on the at-time-of-installation automatic start conditions (900), the multifunction peripheral (100) executes an automatic start determination (step S2400), and the processing proceeds to step S2306. This automatic start determination (step S2400) will be described below.

In step S2306, based on the result of step S2305 (the details will be described with reference to FIG. 24), the multifunction peripheral (100) determines whether an automatic start process for automatically starting the app is to be performed. At this time, if the app is to be automatically started (YES in step S2306), the processing proceeds to step S2307. Otherwise, the processing for this operation is terminated.

In step S2307, to automatically start the app, the multifunction peripheral (100) displays the blank screen (1302) on the operation unit (204), and the processing proceeds to step S2308.

In step S2308, the multifunction peripheral (100) enables the installed app, and the processing proceeds to step S2309.

In step S2309, the multifunction peripheral (100) displays the app screen (1304) on the operation unit (204).

Figure 24:
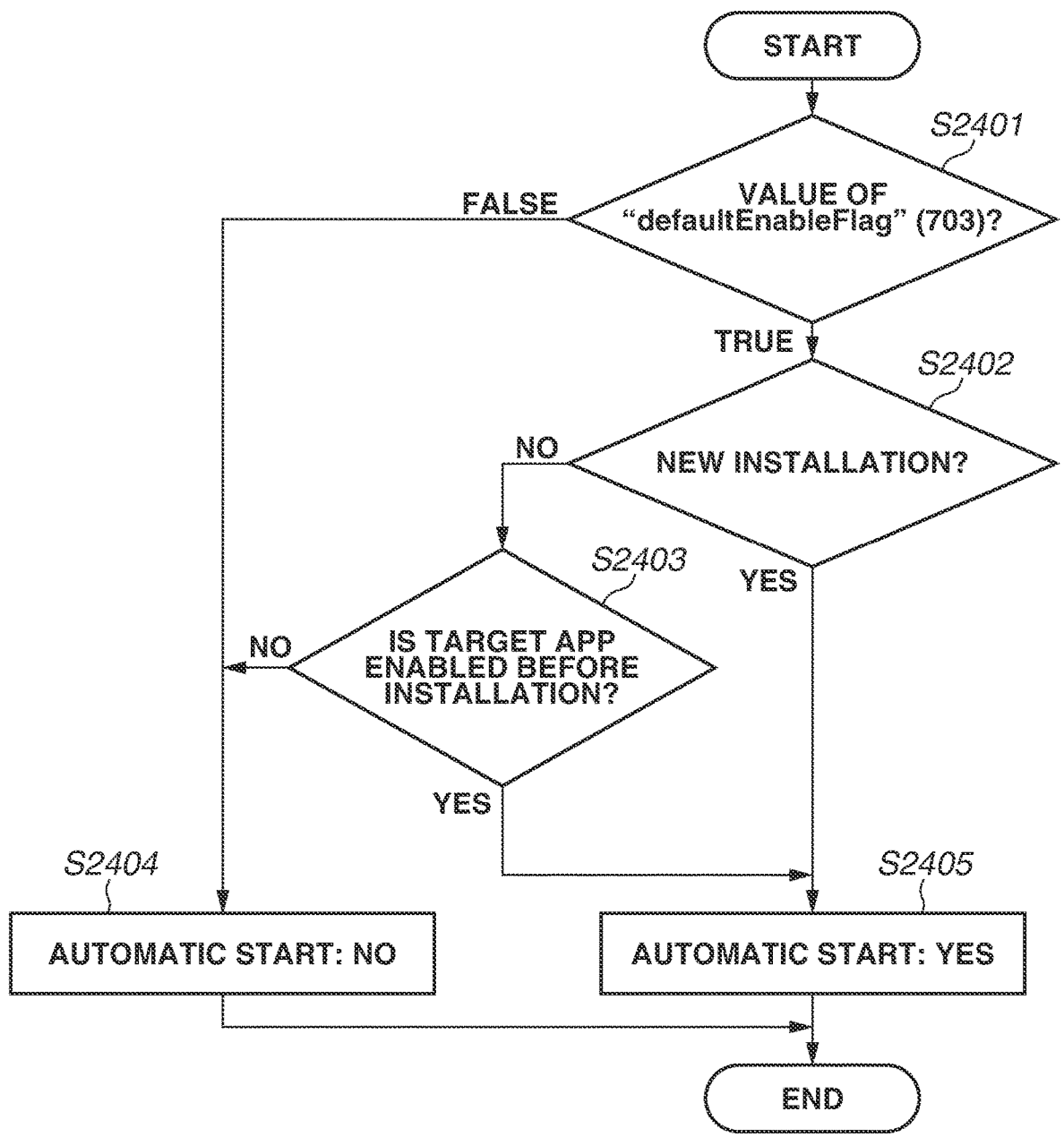
FIG. 24 is a diagram illustrating a flow of an app automatic start determination according to an exemplary embodiment.

Next, the flowchart in FIG. 24 is described. FIG. 24 illustrates the flow of the app automatic start determination executed by the multifunction peripheral (100).

In step S2401, the multifunction peripheral (100) checks the setting of the "defaultEnableFlag" (703). If "FALSE" is set (FALSE in step S2401), the multifunction peripheral (100) determines that the automatic start is "NO". If "TRUE" is set (TRUE in step S2401), it is necessary to make a further determination, and thus, the processing proceeds to step S2402.

In step S2402, the multifunction peripheral (100) checks whether the current installation is a new installation. If the current installation is not a new installation (NO in step S2402), it is necessary to make a further determination, and thus, the processing proceeds to step S2403. If the current installation is a new installation (YES in step S2402), the multifunction peripheral (100) determines that the automatic start is "YES".

In step S2403, the multifunction peripheral (100) checks whether the target app is enabled before this installation process. If the target app is not enabled (NO in step S2403), the multifunction peripheral (100) determines that the automatic start is "NO". If the target app is enabled (YES in step S2403), the multifunction peripheral (100) determines that the automatic start is "YES".

This is the configuration of the present exemplary embodiment. Although not described in the above exemplary embodiment, the following control may also be performed as a control method.

For example, the device type information (800) acquired from the multifunction peripheral (100) may include not only the device type name (801) and the model information (802) but also the size of the operation unit (204), the capacity and the remaining capacity of the ROM (202), the size of the DRAM (203), and license information.

Furthermore, the device type/app package correspondence list (502) may have items including not only the device type name (801) but also the size of the DRAM (203), license information, and the size of the operation unit (204).

In the case of the multifunction peripheral (100) immediately after being installed, according to the execution of the processing in FIG. 14, the screen in FIG. 10 is displayed on the browser (101), and the browser (101) waits in step S1403. On the basis that the device connection button 1004 is pressed, the processes of steps S1404 and S1405 are executed. Then, in step S1406, the browser (101) acquires the installed app package list (1201) from the multifunction peripheral (100). If nothing is installed immediately after the multifunction peripheral (100) is installed, information indicating this state is transmitted to the browser (101). Next, the browser (101) transmits the device type information (800) acquired in step S1405 to the app server apparatus 2001. Suppose that the device type name (801) of the device type information (800) of the multifunction peripheral (100) is "STERA_X3". The app server apparatus 2001 performs the processing in FIG. 18. With reference to the field of "STERA_X3" of the device type/app package correspondence list (502), the app server apparatus 2001 generates the installable package list (1101) as described in step S1802. Then, the app server apparatus 2001 transmits the installable package list (1101) to the browser (101). In this example, a list including the applications 1 and 2 is generated and transmitted to the browser (101).

On the basis that the script (401) is executed using the above information, the app installation management screen (1100) is generated as illustrated in step S1503. In such a case, the screen in FIG. 11 is displayed on the browser (101). Then, on the basis that the button for the action (1105) of an app package in FIG. 11 is pressed, the processing in FIG. 16 is performed. In this example, the browser (101) requests the app server (103) to acquire the application 1. Then, steps S1602 and S1603 are executed. Ultimately, application information including the program body of the application 1 and the app setting file (604) is transmitted from the app server (103) to the browser (101). Then, the application information is transmitted from the browser (101) to the multifunction peripheral (100). Then, in step S1701 in FIG. 17, the installed package list (1201) is acquired as a response to step S1603. Then, in step S1702, using information including the app package list 1201, the display is updated on the web browser (101). That is, using the installed package list (1201) as an input and based on the execution of the script (401), the screen in FIG. 11 is updated to the screen in FIG. 12, and the screen in FIG. 12 is displayed on the browser (101).

An example of a server apparatus is the app server apparatus 2001. An example of a peripheral device is the multifunction peripheral (100). An example of an information processing apparatus in which a web browser (101) is provided is the client PC 2000.

The CPU 2503 executes a script received via the web browser (101).

According to execution of the script by the CPU 2503, device identification information about the multifunction peripheral (100) is received from the multifunction peripheral (100) (an example of reception of identification information). An example of the device identification information is illustrated as the device type information (800).

The browser 101 transmits the received device type information (800) to the app server apparatus 2001. The browser 101 receives application information from the app server apparatus 2001.

The browser 101 transmits the application information received by the browser 101 to the multifunction peripheral 100 so that the multifunction peripheral 100 installs an application.

Further, according to the fact that the application information is received (an example of reception of application information), the following process is performed. This is the process of displaying on a screen of the web browser 101 a confirmation screen that includes display for executing the script and identifying the application information and is also used to give an instruction to perform an installation.

Further, after the DSP 2508, which is an example of a display unit, displays the confirmation screen, and according to the fact that a user provides a predetermined input, the script is executed. Furthermore, the browser 101 transmits the application information to the multifunction peripheral 100 according to the predetermined input.

The application information includes an application program and a start condition for the application program. Furthermore, the multifunction peripheral 100 controls a start of the application program according to the start condition. An example of the start condition is illustrated in FIG. 7.

The application information includes information indicating whether an application installed on the multifunction peripheral 100 is enabled. On the basis of the application information, control is performed to determine whether the installed application is to be enabled in the multifunction peripheral 100.

The application information includes information for identifying an application installed on the multifunction peripheral 100. Further, according to the information for identifying the application installed on the multifunction peripheral 100, an uninstallation is performed. That is, according to the execution of the script, a screen including an instruction unit for, according to the information for identifying the application, uninstalling the installed application from the multifunction peripheral 100 is displayed on a screen of the web browser 101.

The app server apparatus 2001 has been discussed, which is an example of a server apparatus configured to communicate with a client PC 2000 in which a web browser configured to communicate with a multifunction peripheral 100 is provided.

The app server apparatus 2001 transmits a script to the client PC 2000. The app server apparatus acquires device type identification information about the multifunction peripheral 100 acquired from the multifunction peripheral 100 according to the fact that the script is executed by the client PC 2000. The app server apparatus specifies an application program corresponding to the acquired device type identification information. The app server apparatus 2001 transmits, to the client PC 2000, application information including the specified application program and screen information for instructing the multifunction peripheral 100 to install the application program.

According to the present exemplary embodiment, a user does not need to prepare an app package in advance. Further, with a single click using an app provision page for providing the app package and a script, it is possible to acquire the app package from an app server, and install and enable the app package on a peripheral device. Then, it is possible to write the name of an app and the file path when the app is installed and enable the app after the installation at a time. This configuration enables the user to install and enable an app with a single click, thus reducing the burden on the user in introducing the app.

According to the present exemplary embodiment, a mechanism for effectively managing an application operating on a peripheral device can be provided. According to the present exemplary embodiment, with a simple operation of a user, an application necessary for a peripheral device can be checked and the use of the necessary application in the peripheral device is enabled.

According to an aspect of the present exemplary embodiment, it is possible to provide a mechanism for, with a simple operation of a user, checking an application necessary for a peripheral device and also enabling the use of the necessary application in the peripheral device.

OTHER EMBODIMENTS

Embodiment(s) of the disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the disclosure has been described with reference to exemplary embodiments, it is to be understood that the disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2017-128044, filed Jun. 29, 2017, which is hereby incorporated by reference herein in its entirety.

What is claimed is:

1. An information processing apparatus communicable with an application server, a web server, and a printer device via a network, the information processing apparatus comprising:
a web browser configured to receive, from the web server, a web page for inputting access information for accessing the printer device, the web page including a script for installing an application program,
wherein the web browser displays the web page on a display,
the web browser receives the access information, inputted on the web page, for accessing the printer device,
the information processing apparatus executes the script by using the received access information, according to an input of an instruction for connecting to the printer device received on the web page,
wherein, the information processing apparatus executes following operations of (i)-(v) automatically, according to the execution of the script:
(i) transmitting a request for acquiring printer device type information via the network to the printer device indicated by the access information,
(ii) receiving the printer device type information from the printer device via the network,
(iii) passing the printer device type information received from the printer device to the application server via the network,
(iv) receiving, from the application server via the network, at least one application program specified by the printer device type information, and
(v) passing the received at least one application program to the printer device indicated by the access information via the network.

2. The information processing apparatus according to claim 1, wherein the application server and the web server are a same server.

3. The information processing apparatus according to claim 1, wherein information about the at least one program corresponding to the printer device type information is displayed on the display.

4. The information processing apparatus according to claim 1, wherein an application program specified via the display is received from the application server.

5. The information processing apparatus according to claim 1, wherein an installed application program is transmitted to the printer device and displayed on the web page, and an instruction for enabling the application program is received.

6. The information processing apparatus according to claim 1, wherein an installed application program is transmitted to the printer device and displayed on the web page, and an instruction for uninstalling the application program is received.

7. The information processing apparatus according to claim 1, wherein at least one application program to be uninstalled in response to the instruction received on the web page is received from the application server.

8. An information processing method for an information processing apparatus communicable with an application server, a web server, and a printer device via a network, the information processing apparatus including a display and a web browser,
wherein the web browser receives, from the web server, a web page for inputting access information for accessing the printer device, the web page including a script for installing an application program,
the web browser displays the web page on a display,
the web browser receives the access information, inputted on the web page, for accessing the printer device,
the information processing apparatus executes the script by using the received access information according to an instruction for connecting to the printer device received on the web page,
wherein, according to an execution of the script, the information processing apparatus executes, following operations of (i)-(v) automatically:
(i) transmitting a request for acquiring printer device type information via the network to the printer device indicated by the access information,
(ii) receiving the printer device type information from the printer device via the network,
(iii) passing the received printer device type information to the application server via the network,
(iv) receiving, from the application server, at least one application program specified by the printer device type information via the network, and
(v) passing the received at least one application program to the printer device indicated by the access information via the network.

9. The information processing method according to claim 8, wherein the application server and the web server are a same server.

10. The information processing method according to claim 8, wherein information about the at least one program corresponding to the printer device type information is displayed on the display.

11. The information processing method according to claim 8, wherein an application program specified via the display is received from the application server.

12. The information processing method according to claim 8, wherein an installed application program is transmitted to the printer device and displayed on the web page, and an instruction for enabling the application program is received.

13. The information processing method according to claim 8, wherein an installed application program is transmitted to the printer device and displayed on the web page, and an instruction for uninstalling the application program is received.

14. The information processing method according to claim 8, wherein at least one application program to be uninstalled in response to the instruction received on the web page is received from the application server.

\* \* \* \* \*